(12) United States Patent
Agata et al.

(10) Patent No.: US 10,878,584 B2
(45) Date of Patent: Dec. 29, 2020

(54) SYSTEM FOR TRACKING OBJECT, AND CAMERA ASSEMBLY THEREFOR

(71) Applicant: HITACHI KOKUSAI ELECTRIC INC., Tokyo (JP)

(72) Inventors: Yoshiki Agata, Tokyo (JP); Kunihiro Soga, Tokyo (JP); Muneaki Yamaguchi, Tokyo (JP); Yuichiro Komiya, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 89 days.

(21) Appl. No.: 15/922,949

(22) Filed: Mar. 16, 2018

(65) Prior Publication Data
US 2018/0204335 A1  Jul. 19, 2018

Related U.S. Application Data

(63) Continuation-in-part of application No. PCT/JP2016/077237, filed on Sep. 15, 2016.

(30) Foreign Application Priority Data

Sep. 17, 2015  (JP) .................................. 2015-184125

(51) Int. Cl.
*G06T 7/292* (2017.01)
*G08G 1/04* (2006.01)
(Continued)

(52) U.S. Cl.
CPC .......... *G06T 7/292* (2017.01); *G06K 9/00771* (2013.01); *G06K 9/00798* (2013.01);
(Continued)

(58) Field of Classification Search
CPC ........ G06T 7/292; G06T 7/62; H04N 5/23299
See application file for complete search history.

(56) References Cited

U.S. PATENT DOCUMENTS

| 2001/0017933 A1* | 8/2001 | Chujoh | G08G 1/04 382/104 |
| 2006/0009702 A1* | 1/2006 | Iwaki | A61B 5/00 600/520 |

(Continued)

FOREIGN PATENT DOCUMENTS

| JP | 10-91899 A1 | 4/1998 |
| JP | 11-39589 A | 2/1999 |

(Continued)

OTHER PUBLICATIONS

International Search report from International Application No. PCT/JP2016/077237 dated Nov. 29, 2016.

(Continued)

*Primary Examiner* — James T Boylan
(74) *Attorney, Agent, or Firm* — Brundidge & Stanger, P.C.

(57) ABSTRACT

Disclosed is an autonomous distributed system for detecting and tracking a falling object within a region being monitored by using a plurality of camera assemblies cooperating with each other, and disclosed is a camera assembly therefor. Each of the camera assembly, normally, operates in a falling object detecting mode, but, when detecting a falling object, shifts to a tracking mode. In the tracking mode, a degree of danger of the falling object is determined by referring to the size of the falling object in real space and the movement of a falling. In addition, when the falling object is further tracked and moved outside of the angle of view, a search request including information of the degree of danger as to the falling object is issued to surrounding camera assemblies, such that the multiple camera assemblies search for the falling object in cooperation.

17 Claims, 16 Drawing Sheets

(51) Int. Cl.
*G06K 9/00* (2006.01)
*G08B 23/00* (2006.01)
*H04N 7/18* (2006.01)
*G06K 9/46* (2006.01)
*G08B 25/00* (2006.01)
*G08G 1/01* (2006.01)
*G06K 9/62* (2006.01)
*H04N 5/232* (2006.01)
*G06T 7/246* (2017.01)
*H04N 5/247* (2006.01)
*G06T 7/62* (2017.01)
*G06K 9/66* (2006.01)
*G08B 29/18* (2006.01)

(52) U.S. Cl.
CPC ........... *G06K 9/00825* (2013.01); *G06K 9/46* (2013.01); *G06K 9/6267* (2013.01); *G06K 9/66* (2013.01); *G06T 7/246* (2017.01); *G06T 7/62* (2017.01); *G08B 23/00* (2013.01); *G08B 25/00* (2013.01); *G08B 25/006* (2013.01); *G08B 29/188* (2013.01); *G08G 1/0116* (2013.01); *G08G 1/0133* (2013.01); *G08G 1/0141* (2013.01); *G08G 1/04* (2013.01); *H04N 5/23206* (2013.01); *H04N 5/23216* (2013.01); *H04N 5/23296* (2013.01); *H04N 5/23299* (2018.08); *H04N 5/247* (2013.01); *H04N 7/181* (2013.01); *G06K 9/00785* (2013.01); *G06K 9/4652* (2013.01); *G06K 9/6202* (2013.01); *G06K 2209/21* (2013.01); *G06T 2207/10016* (2013.01); *G06T 2207/10024* (2013.01); *G06T 2207/20221* (2013.01); *G06T 2207/30232* (2013.01); *G06T 2207/30236* (2013.01); *G06T 2207/30256* (2013.01); *G06T 2207/30261* (2013.01)

(56) References Cited

U.S. PATENT DOCUMENTS

| | | | |
|---|---|---|---|
| 2006/0049930 A1* | 3/2006 | Zruya | G08B 13/19602 340/500 |
| 2006/0197839 A1* | 9/2006 | Senior | H04N 5/232 348/169 |
| 2009/0157264 A1* | 6/2009 | Linsenmaier | B60R 1/00 701/45 |
| 2011/0273582 A1* | 11/2011 | Gayko | G06T 5/005 348/222.1 |
| 2013/0329052 A1* | 12/2013 | Chew | H04N 7/181 348/159 |
| 2014/0289323 A1* | 9/2014 | Kutaragi | G06Q 50/01 709/203 |
| 2016/0328619 A1* | 11/2016 | Yi | G06K 9/00798 |

FOREIGN PATENT DOCUMENTS

| | | | |
|---|---|---|---|
| JP | 2000-057474 A | | 2/2000 |
| JP | 2001-245284 | * | 9/2001 |
| JP | 2001-245284 A | | 9/2001 |
| JP | 2001-319218 A | | 11/2001 |
| JP | 2002-099903 A | | 5/2002 |
| JP | 2002-230679 A | | 8/2002 |
| JP | 2003-30776 A | | 1/2003 |
| JP | 2006-59184 A | | 3/2006 |
| JP | 5020299 A | | 6/2012 |
| JP | 5720380 A | | 4/2015 |

OTHER PUBLICATIONS

Takashi Fuse, et al., "Development of a Technique for Vehicle Maneuvers Recognition with Sequential Images from High Altitude Platforms" Journal of Infrastructure Planning and Management, Jul. 20, 2003, IV-60, No. 737, p. 159-173.

International Written Opinion from International Application No. PCT/JP2016/077237 dated Nov. 29, 2016.

* cited by examiner

Image recognition device 14
- 141 circuit configured to perform an image data processing
- 142 circuit configured to detect an object
- 143 circuit configured to perform detection of an object on an area
- 144 circuit configured to perform recognition of a vehicle
- 145 circuit configured to convert a coordinate of an object
- 146 circuit configured to perform a method of template matching
- 147 circuit configured to perform a statistical learning method
- 148 circuit configured to perform an image processing method
- 149 circuit configured to perform the processing of Time Space FFT

FIG. 15

SYSTEM FOR TRACKING OBJECT, AND CAMERA ASSEMBLY THEREFOR

CROSS-REFERENCE TO RELATED APPLICATION

The present application is a continuation-in-part application under 35 U.S.C. § 111(a) of International Application No. PCT/JP2016/077237, filed Sep. 15, 2016, which claims priority to Japanese Patent Application No. 2015-184125, filed Sep. 17, 2015. The contents of these applications are incorporated herein by reference in their entirety.

TECHNICAL FIELD

The disclosure relates to a system for detecting and tracking an object, and a camera assembly therefor. The object includes a falling object on a road.

BACKGROUND

Conventionally, it is known that a system for detecting a falling object on a road by using image data output from a camera (see, for example, Patent Documents 1 to 5). In most of the conventional detecting systems, each camera arranged along the road has independently been performing an image processing for detecting a falling object on the road, respectively. When the camera has detected a falling object, the camera notifies a monitoring center of alarm signal including information that there is some falling object in a detecting area. Then, the monitoring center issues dispatch orders to a falling object correcting vehicle.

Further, it is known that a traffic control system for classifying an occurrence event such as congestion or an input event, into a cause event and a result event (for example, see Patent Document 6).

In addition, an intruding object monitoring method for tracking the object using a plurality of cameras is known as an image processing technique (for example, refer to Patent Document 7), or an image monitoring apparatus with converting from the acquired image coordinate system to a drawing coordinate system by calibrating camera parameters, is known as an image processing technique (for example, refer to Patent Document 8).

CITATION LIST

Patent Document

Patent Document 1: Japanese Patent No. 5720380
Patent Document 2: Japanese Patent No. 5020299
Patent Document 3: Japanese Patent Application Laid-Open Publication No. 2003-30776
Patent Document 4: Japanese Patent No. 3536913
Patent Document 5: Japanese Patent Application Laid-Open Publication No. 11-39589
Patent Document 6: Japanese Patent Application Laid-Open Publication No. 2000-057474
Patent Document 7: Japanese Patent No. 3643513
Patent Document 8: Japanese Patent Application Laid-Open Publication No. 2001-319218

Non Patent Document

Non Patent Document 1: Takashi FUSE, two others: "Development of a Technique for Vehicle Maneuvers Recognition with Sequential Images from High Altitude Platforms" Journal of Infrastructure Planning and Management, Jul. 20, 2003, IV-60, No. 737, Page 159 to 173, Internet <URL: http://planner.t.u-tokyo.ac.jp/archive/web/research/fuse/vehicle_recognition.pdf>

SUMMARY

Conventional falling object detection system has two problems. First, when a falling object is detected, the degree of danger as to the falling object is not taken into consideration. For example, a heavy and large falling object such as an iron pipe or a drum should be estimated at high degree of danger, a light and small falling object like a plastic bag should be estimated at low degree of danger. In a situation that degree of danger as to a falling object is not considered, there is a risk that delay of the collecting work as to the dangerous falling object may lead to serious accidents, furthermore, a loss that collecting an object which does not need to be collected may be generated.

A second problem is that each camera connected to a network has independently been performing detecting a falling object, respectively. When each camera operates independently for detecting a falling object, the required total capability for image processing in the network may increase in proportion to the number of cameras connected to the network. Furthermore, it takes time to grasp a situation that the detected falling object moved to a monitoring range of the other camera, for example, as a result that the detected falling object came in contact with a vehicle.

The disclosure provides a system for detecting and tracking an object, and camera assembly therefor. The system can quickly initialize a collection operation as to the object including a falling object on a road by considering the degree of danger as to the object, and make the grasp of the situation more effectively by cooperating with peripheral cameras.

In one aspect of the disclosure, a system consists of at least a plurality of camera assemblies connected to a network, each camera assembly is arranged at an area to be monitored, respectively. A camera assembly can detect an object by referring to images within an angle of view, captured by an imaging device of the camera assembly. When the camera assembly detects an object, the camera assembly may issue a message notifying that the camera assembly detects the object to other device connected to a network. The object may include a falling object from a vehicle on a road. For example, in a normal state, each of the plurality of camera assemblies searches for a fallen object on the road to be monitored by controlling cyclically the photographing angle of view of the camera, respectively.

When a camera assembly detects a falling object, the camera assembly may transmit a message including a degree of danger as to the falling object to other device connected to a network, then a controlling procedure of the camera assembly may shift to Tracking mode to track the falling object.

The degree of danger may be evaluated at least by considering a moving state of the falling object, or a size of the falling object in real space. As the moving state, at least general movement and partial movement as to the falling object may be observed using the camera assembly. When the camera assembly determines that the falling object moved, the camera assembly may transmit a message including a reevaluated degree of danger to other device connected to a network. When the falling object is lost from the angle of view of the camera assembly, the camera assembly may transmit a message including a request for searching the object to the other camera assembly connected to the network.

The message may include area information about the area firstly look for the object. When the other camera assembly receives the message including a request for searching the object and the area information regarding the object, the camera assembly firstly searches the area specified by the area information for the object. For example, the area information may include the information about the place where the object really exists or the information about the possible place where the object may exist. For example, the area information may include at least one of the information regarding a location of the camera assembly which detects the object, the information regarding a current location of the object, or the information regarding a location that the falling object may exist on the global coordinate system, predicted by referring to a moving path of the falling object.

A timing to transmit the message including the request for searching the object to the other device connected to the network is not limited to the timing when the falling object is lost from the angle of view of the camera assembly. The message including the request for searching the object to the other device connected to the network may transmit at any timing including following timings:
(1) A timing when the camera assembly determines that the object cannot be captured clearly, for example, based at least in part on influence of bad natural environments.
(2) A timing when the camera assembly determines that the object is far away.
(3) A timing when the camera assembly predicts that the object may move to the outside of the angle of view soon.
(4) A timing when the camera assembly determines that the other device can capture the falling object more clearly.

The other device connected to the network, which might receive the message including the request for searching an object may correspond to a surrounding camera assembly. For example, a different camera assembly installed around the camera assembly, which transmitted the message including the request for searching the object, may correspond to the camera assembly, which should search the falling object continuously. When the different camera assembly receives a message including the request for searching the falling object, and the area information to be searched, the different camera assembly may change its operational mode to Request mode. In Request mode, the camera assembly may search for the falling object by turning initially an angle of view of an imaging device to a direction identified by the area information in received message.

According to one aspect of the disclosure, it is possible to collect a falling object having high degree of danger quickly, and to prevent the occurrence of serious accidents. Furthermore, when a falling object moves, tracking the object is performed in conjunction with the surrounding camera, so grasping the on-site situation can do effectively.

BRIEF DESCRIPTION OF DRAWINGS

FIG. 15 shows an image recognition device in accordance with an embodiment of the present disclosure.

DESCRIPTION OF EXEMPLARY EMBODIMENTS

In a normal situation, a falling object detecting system according to an embodiment of the disclosure searches for a certain object other than a vehicle, in other words, a falling object on the road, by changing a photographing angle of view of a camera cyclically, according to preset data for controlling the photographing angle of view of the camera. When the camera detects an object image within the photographing angle of view of camera, an alarm message including the information as to a degree of danger may be issued from the camera, and a controlling procedure of the camera shifts to Tracking mode. In Tracking mode, the degree of danger may be reevaluated by observing at least a position, a size or movement of the object. When it is presumed that the object was moved, for example, caused by coming in contact with another vehicle or the like, a new alarm may be issued with referring to the degree of danger, which has reevaluated in the system. For example, the new alarm issued by the camera may correspond to a message of Accident Outbreak Warning message.

Embodiment 1

Figure 1:
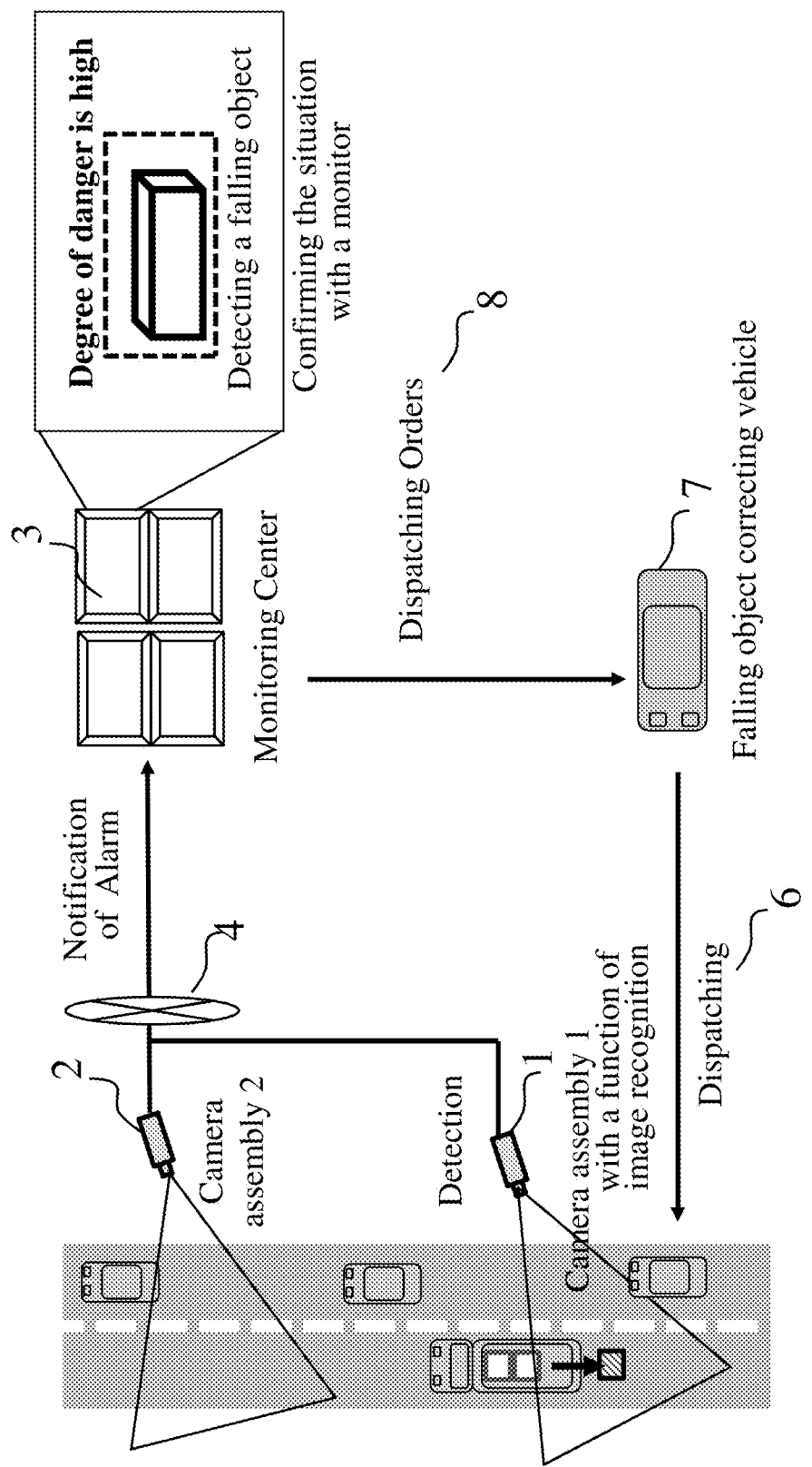
FIG. 1 is a diagrammatic illustration indicating one embodiment of a falling object detecting system.

FIG. 1 is a diagrammatic illustration of a falling object detecting system according to a first embodiment. The falling object detecting system includes a plurality of camera assemblies, each camera assembly 1 arranged to along a road so as to photograph a monitoring area of the road, respectively, monitoring center 3 for monitoring the images received from the each camera assembly 1 and outputting instructions as necessary, and network 4 for connecting each camera assembly 1 with monitoring center 3. For example, two camera assemblies consisted of camera assembly 1 and camera assembly 2 are representative in the embodiment, a plurality of camera assemblies, more than two camera assemblies, can be arranged with an appropriate distance each other and located along the road. Each camera assembly 1 or camera assembly 2 may include an electrical panning and tilting head, an electrical zooming lens, or an image recognition device for detecting and tracking an object. Each camera assembly 1 or camera assembly 2 may issue an alarm notification to monitoring center 3 via network 4 when detecting an object, respectively. Each camera assembly 1 or camera assembly 2 can be arranged corresponding to each Electronic Toll Collection System (ETC) roadside machine respectively, for the purpose of considering ETC 2.0 non-compliant vehicle.

A display device installed in monitoring center 3 is connected to camera assembly 1 via network 4. The display device is configured to display an image of the falling object captured by camera assembly 1, with information regarding the degree of danger as to the falling object. The information regarding the degree of danger as to the falling object to be displayed is determined by referring to at least the degree of danger identified by camera assembly 1. The display device may have an attribute circuit configured to display the degree of danger as to the falling object at a screen, with various attribute corresponding to each degree of danger.

When a device installed in monitoring center 3 receives the alarm notification, a device installed in monitoring center 3, including the display device can support an operation of an operator by displaying the degree of danger as to the falling object at a screen, with various attribute corresponding to each degree of danger. For example, the operation of the operator may include issuing dispatching orders to a falling object collecting vehicle. Since the image as to the falling object is tracked by image recognition process in camera assembly 1, the image as to the falling object can be automatically displayed under zooming up appropriately. Furthermore, the operator can arbitrarily change the camera assembly from the camera assembly 1 currently capturing the falling object to another camera assembly, or change the display mode from current display mode to another display mode. At this time, when it is judged that an accident was broken out, it is good to be able to easily contact the nearest fire department (ambulance), police, etc. in addition to the falling object collecting vehicle. Network 4 is a communication medium capable of IP communication, for example, an optical network such as Gigabit Ethernet-Passive Optical Network (GE-PON) may be selected. The term, "Gigabit Ethernet-Passive Optical Network (GE-PON)" and the term, "Ethernet" are trademarks.

Figure 2:
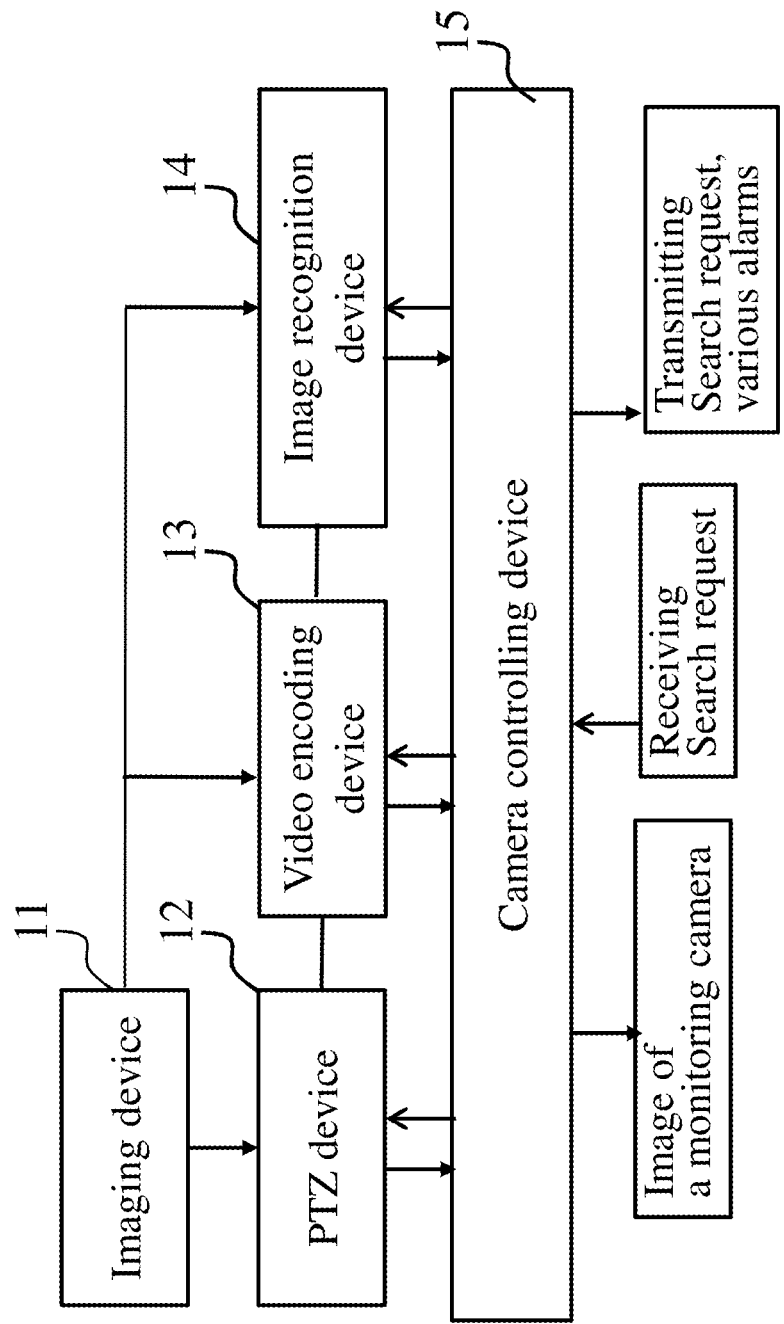
FIG. 2 is a hardware block diagram indicating one embodiment of camera assembly 1, 2.

FIG. 2 is a hardware block diagram of camera assembly 1 for the falling object detecting system in the embodiment. Each of camera assembly 1 or camera assembly 2 may include similar circuits, respectively. Each of camera assembly 1 or camera assembly 2 includes imaging device 11, PTZ device 12, video encoding device 13, image recognition device 14, and camera controlling device 15, respectively.

Figure 12:
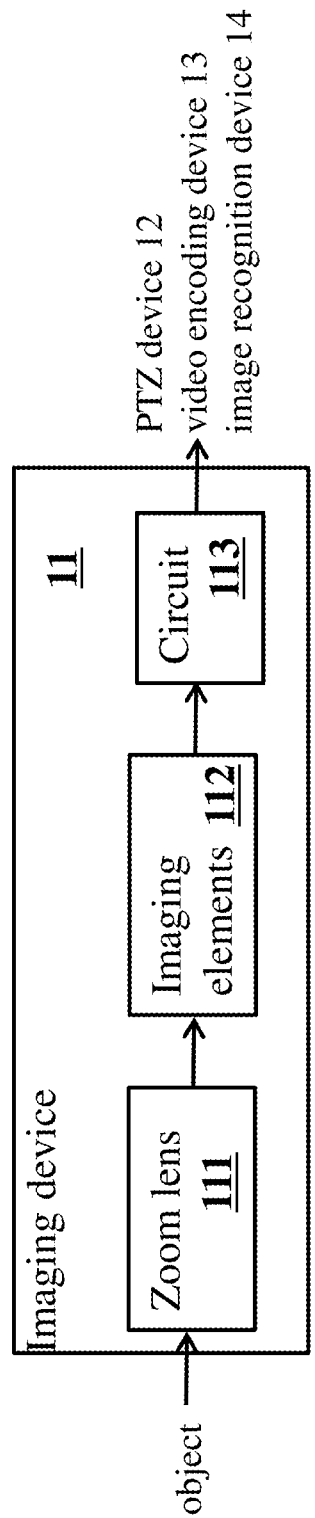
FIG. 12 shows an imaging device in accordance with an embodiment of the present disclosure.

FIG. 12 shows imaging device 11 in accordance with an embodiment of the present disclosure.

Imaging device 11 may include a main body of camera having at least imaging elements 112 and zoom lens 111 for coordinating a focus with an object. The imaging elements 112 may include color or monochrome image elements.

Imaging device 11 may include circuit 113 to output a digital image signal captured by the imaging elements 112, to each of PTZ device 12, video encoding device 13, or image recognition device 14.

Figure 13:
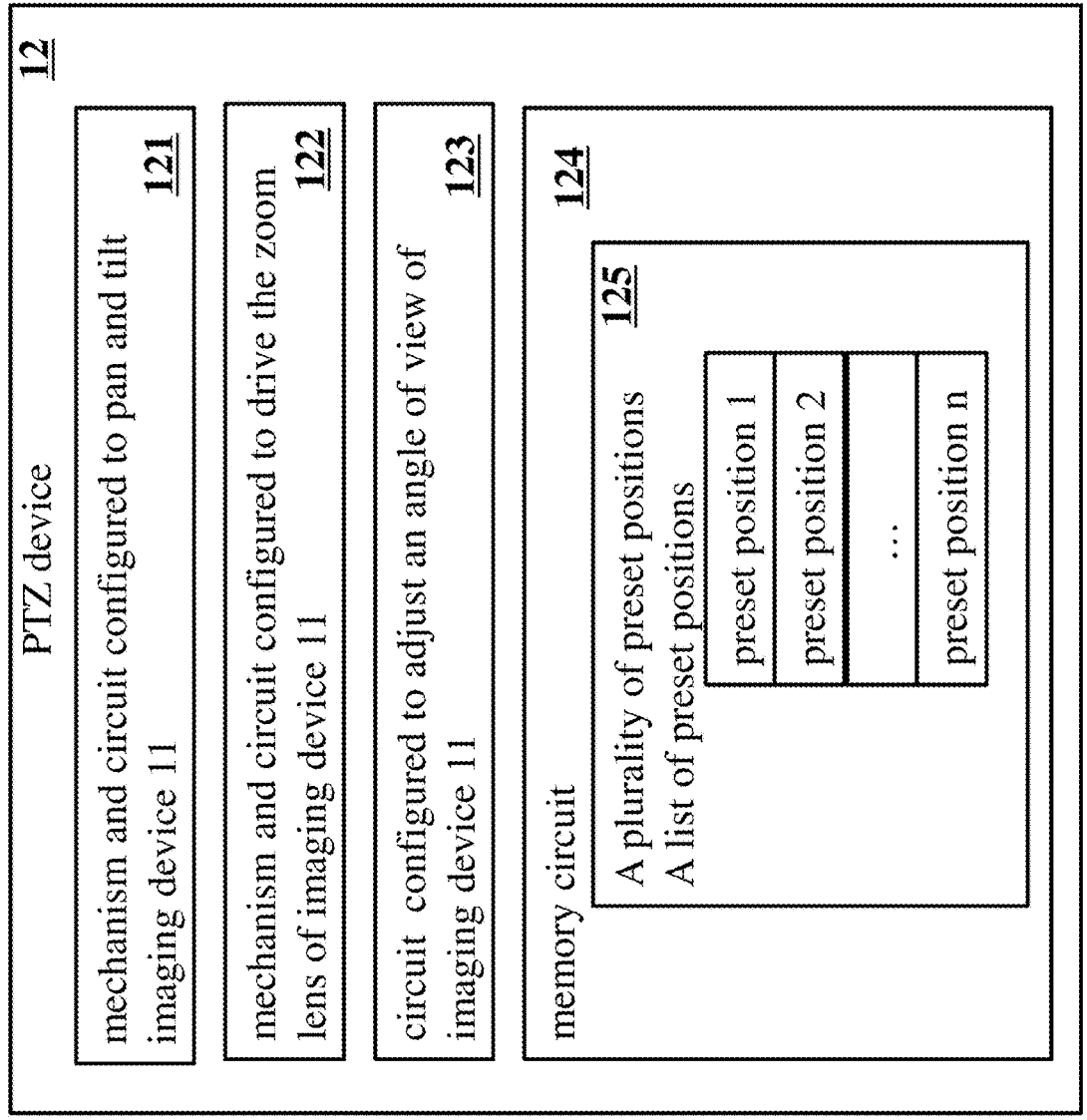
FIG. 13 shows a PTZ device in accordance with an embodiment of the present disclosure.

FIG. 13 shows PTZ device 12 in accordance with an embodiment of the present disclosure.

PTZ device 12 may contain a mechanism for supporting and driving imaging device 11. PTZ device 12 may include mechanism and circuit 121 configured to pan and tilt imaging device 11. PTZ device 12 may include mechanism and circuit 122 configured to drive the zoom lens of imaging device 11. PTZ device 12 may include circuit 123 configured to adjust an angle of view of imaging device 11 according to a specific preset position, which is identified by camera controlling device 15.

PTZ device 12 may include memory circuit 124 to memorize a plurality of preset positions 125. Each preset position may include a controlling value of panning operation of imaging device 11 to direct a specific target, a controlling value of tilting operation of imaging device 11 to direct the specific target, and a controlling value of zooming operation of imaging device 11 to focus the specific target, respectively.

Memory circuit 124 in PTZ device 12 may be configured to store a list of preset positions 125 containing a plurality of preset positions. The list of preset positions 125 may include at least one of following preset positions:

(1) Preset position 1 corresponding to an area around camera assembly 1
(2) Preset position 2 corresponding to an area around another camera assembly, installed in the neighboring area
(3) Preset position 3 corresponding to one of the divided areas from a vicinity of camera assembly 1 to an adjacent camera assembly
(4) Preset position 4 corresponding to an area where searching for an object may be requested from the other camera assembly Each preset position can be set so that imaging device 11 can capture each area at appropriate magnification, respectively.

PTZ device 12 may include a mechanism or circuit configured to pan and tilt imaging device 11, or drive the zoom lens of imaging device 11 by referring to a controlling values of panning, tilting or zooming operation, directly identified from camera controlling device 15, without referring to the preset position memorized in the memory circuit of PTZ device 12.

Figure 14:
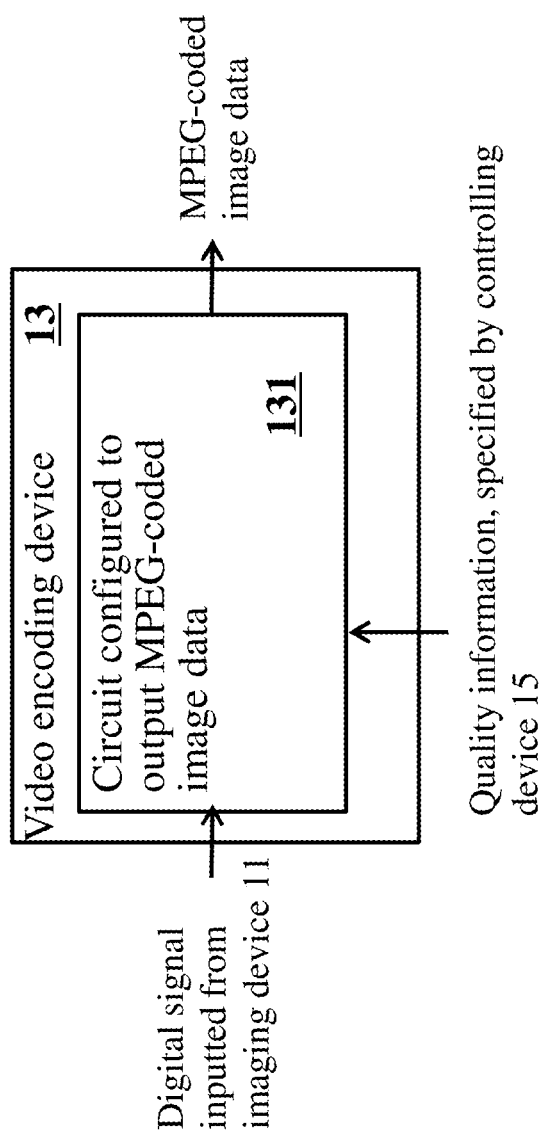
FIG. 14 shows a Video encoding device in accordance with an embodiment of the present disclosure.

FIG. 14 shows Video encoding device 13 in accordance with an embodiment of the present disclosure.

Video encoding device 13 may include circuit 131 configured to encode a digital signal inputted from imaging device 11 to MPEG-code with a quality specified by camera controlling device 15.

Video encoding device 13 may include circuit 131 configured to output the MPEG-coded image data with the specified quality as an image data captured by camera assembly 1, to a device connected to network 4 through interface circuit 1541.

FIG. 15 shows Image recognition device 14 in accordance with an embodiment of the present disclosure.

Image recognition device 14 may include processing circuit 141 configured to perform an image data processing and an image recognition processing on the digital signal from imaging device 11.

Image recognition device 14 may include circuit 142 configured to detect an object by referring to images within an angle of view, captured by imaging device 11 of the camera assembly 1.

Image recognition device 14 may include circuit 143 configured to perform detection of an object on an area, or especially perform a detection of a falling object on a traffic lane or a peripheral area. Circuit 143 may include a circuit configured to recognize a traveling direction of the vehicle, or the traffic lane by optical flow techniques or the like.

Image recognition device 14 may include circuit 144 configured to perform recognition of a normally traveling vehicle, or read a vehicle's registered number from a traveling vehicle.

Image recognition device 14 may include circuit 145 configured to convert a coordinate of an object on the screen coordinate system to a coordinate of the object on the global coordinate system by referring to the controlling values of panning operation, tilting operation, or zooming operation in PTZ device 12.

Image recognition device 14 may include circuit 146 configured to perform a method of template matching for an object, circuit 147 configured to perform a statistical learning method using feature quantities for distinguishing an object from a traveling vehicle or a shadow of the vehicle, circuit 148 configured to perform the image processing method using a background difference for reducing a target area for processing, or circuit 149 configured to perform the processing of Time Space Fast Fourier Transform (Time Space FFT) for identifying a partial movement of the object.

Figure 16:
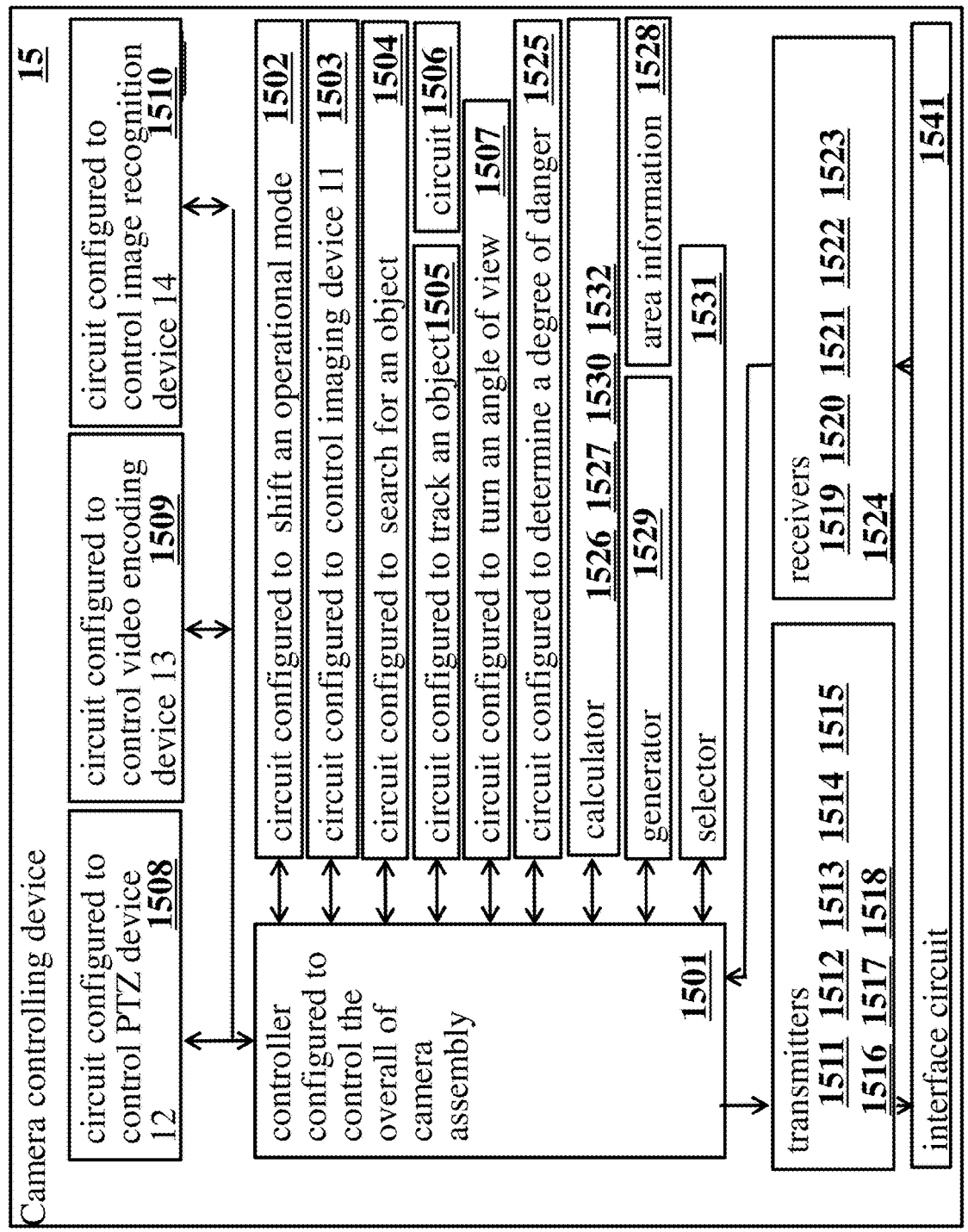
FIG. 16 shows a camera controlling device in accordance with an embodiment of the present disclosure.

FIG. 16 shows Camera controlling device 15 in accordance with an embodiment of the present disclosure.

Camera controlling device 15 may include controller 1501 configured to control the overall of the camera assembly 1 including a transition of an operational mode.

Camera controlling device 15 may include circuit 1502 configured to shift an operational mode.

Camera controlling device 15 may include circuit 1503 configured to control imaging device 11 so as to turn an angle of view of imaging device 11 to a specific direction by using PTZ device 12, the specific direction including a direction identified from the other device including a different camera assembly, connected to a network.

Camera controlling device 15 may include circuit 1504 configured to search for an object on an area to be monitored by controlling cyclically the photographing angle of view of the camera. Circuit 1504 may include a detector configured to detect a specific object as a target object that is identified by other device. Circuit 1504 may include a detector configured to detect a specific object as a target object, the specific object having a characteristic value that is the same as a characteristic value of the target object that was notified of by the other device connected the network, or is close to the characteristic value of the target object. Circuit 1504 may include a detector configured to detect a specific object as a target object, the specific object having a degree of danger that is the same as a degree of danger of the target object that was notified of by the other device connected the network, or is close to the degree of danger of the target object. Circuit 1504 may include a controller configured to control the angle of view of imaging device 11 so as to shift to a traveling direction of the vehicle little by little to look for the object.

Camera controlling device 15 may include circuit 1505 configured to track an object by referring to a characteristic value of an object.

Camera controlling device 15 may include circuit 1506 configured to track an object by referring to a characteristic value of an object, for example, the characteristic value of the object may include a value received from a different camera assembly or other device connected to network 4, via an interface circuit.

Camera controlling device 15 may include circuit 1507 configured to turn an angle of view of imaging device 11 by referring to area information 1528 received from a different camera assembly or other device connected to network 4, via an interface circuit.

Camera controlling device 15 may include circuit 1508 configured to control at least PTZ device 12 so that an image of an object is captured within an angle of view of imaging device 11 by referring to an output of image recognition device 14.

Circuit 1508 may include a circuit configured to control at least PTZ device 12 so that the image of an object is captured at near the center position of the angle of view of imaging device 11, and at suitable magnification.

Camera controlling device 15 may include circuit 1509 configured to control video encoding device 13. Circuit 1509 may include a circuit configured to specify quality rate of MPEG-coding to video encoding device 13. The quality rate of MPEG-coding may include compressibility as to input image data captured by imaging device 11. The quality rate of MPEG-coding may include the quality rate received from the other device connected to network 4. The quality rate of MPEG-coding may be stored in video encoding device 13 or camera controlling device 15. Circuit 1509 may include a circuit configured to flow the MPEG-coded image data with the specified quality, generated by video encoding device 13 to the other device connected to network 4 as an image of a monitoring camera.

Camera controlling device 15 may include circuit 1510 configured to control image recognition device 14 so that image recognition device 14 performs a desired image data processing and an image recognition processing on the digital signal from imaging device 11.

Camera controlling device 15 may include transmitter 1511 configured to transmit coded video data captured by imaging device 11 to at least a device connected to network 4, by using interface circuit 1541.

Camera controlling device 15 may include transmitter 1512 configured to transmit a message including a request for searching a specific object to a different camera assembly or a device connected to network 4, via interface circuit 1541.

Camera controlling device 15 may include transmitter 1513 configured to transmit a message notifying that the camera assembly 1 detects the object to other device connected to network 4, via interface circuit 1541.

Camera controlling device 15 may include transmitter 1514 configured to transmit a message including at least a degree of danger as to an object to other device connected to network 4, via interface circuit 1541. Transmitter 1514 may include a circuit configured to transmit a message including a degree of danger depending on positional information of the object, identified by circuit 143 in image recognition device 14. Circuit 143 may include a circuit configured to recognize a traveling direction of the vehicle, or the traffic lane by optical flow information.

Camera controlling device 15 may include transmitter 1515 configured to transmit a command for Search Request as a message including a request for searching an object to a different camera assembly or other device connected to network 4, via interface circuit 1541.

Camera controlling device 15 may include transmitter 1516 configured to transmit a message including area information 1528 to be searched by a different camera assembly, to the different camera assembly or other device connected to network 4, via interface circuit 1541.

Camera controlling device 15 may include transmitter 1517 configured to transmit a message including characteristic value of an object to a different camera assembly or other device connected to network 4, via interface circuit 1541.

Camera controlling device 15 may include transmitter 1518 configured to transmit a message including the request for searching an object to a different camera assembly or other device connected to network 4, via interface circuit 1541, at any timing including following timings:

(1) A timing when output of image recognition device 14 shows that the object cannot be captured appropriately.
(2) A timing when output of image recognition device 14 shows that the object is far away.
(3) A timing when output of image recognition device 14 shows that the object may move to the outside of the angle of view soon.
(4) A timing when output of image recognition device 14 shows that the other device can capture the object more appropriately.

Camera controlling device 15 may include receiver 1519 configured to receive a command as a message including the request for searching the specific object from a different camera assembly 1 or a device connected to network 4, via interface circuit 1541.

Camera controlling device 15 may include receiver 1520 configured to receive a message notifying that the different camera assembly 1 detects the object, from other device connected to network 4, via interface circuit 1541.

Camera controlling device 15 may include receiver 1521 configured to receive a message including at least a degree of danger as to a falling object from other device connected to network 4, via interface circuit 1541.

Camera controlling device 15 may include receiver 1522 configured to receive a command for Search Request as a message including a request for searching an object from a different camera assembly 1 or other device connected to network 4, via interface circuit 1541.

Camera controlling device 15 may include receiver 1523 configured to receive a message including area information 1528 to be searched, from a different camera assembly or other device connected to network 4, via interface circuit 1541.

Camera controlling device 15 may include receiver 1524 configured to receive a message including characteristic value of an object, from a different camera assembly or other device connected to network 4, via interface circuit 1541.

Camera controlling device 15 may include circuit 1525 configured to determine a degree of danger as to an object by considering moving information of the object, and a size of the object in real space.

Camera controlling device 15 may include calculator 1526 to identify the degree of danger, configured to calculate the size of the object in a real space by performing coordinate conversion from a screen coordinate system to a global coordinate system, using at least controlling values of panning, tilting, or zooming as to the object, for example, memorized in PTZ device 12 or camera controlling device 15. Calculator 1526 may include a calculator configured to calculate the size of the object in a real space by comparing with a specific object that size is known, the specific object being captured within an angle of view same as the object. Calculator 1526 may include an estimator configured to estimate the degree of danger at high when the size of the object in the real space is larger than an average size or a predetermined size of an object regardless of the material of the object, or when the object does not have movement generally regardless of the size of the object. Calculator 1526 may include an estimator configured to estimate the degree of danger at high when a ratio of a moving portion is smaller than a predetermined value. Calculator 1526 may include an estimator configured to estimate the degree of danger at low when the size of the object in the real space is smaller than the average size or a predetermined size of the object, and the object moves generally.

Camera controlling device 15 may include calculator 1527 configured to calculate area information 1528 including coordinate information on the global coordinate system as to a target object by referring to at least position information of camera assembly 1, and control values for panning, tilting, or zooming to the target object, for example, memorized in PTZ device 12 or camera controlling device 15.

Area information 1528 may include information to be searched by a different camera assembly, area information 1528 including at least one of the following position information, the position information of the camera assembly, the current position information of the object, or the position information that the object may exist on the global coordinate system, predicted by referring to a moving path of the object.

Camera controlling device 15 may include generator 1529 configured to generate the message including area information 1528 to be searched at a different camera assembly.

Camera controlling device 15 may include calculator 1530 configured to calculate coordinate information on the global coordinate system as to a target object by referring to at least position information of camera assembly 1, control values for panning, tilting, or zooming to the target object, for example, memorized in PTZ device 12 or camera controlling device 15.

Camera controlling device 15 may include selector 1531 to select an angle of view of imaging device 11 in a different camera assembly, the angle of view being expected a detection of the target object.

Camera controlling device 15 may include calculator 1532 configured to calculate the characteristic value of an object. For example, calculator 1532 may include a calculator configured to calculate the characteristic value of an object, including information as to a shape of the object, or parameters in the Hue, Saturation, Value (HSV) space.

Figure 3:
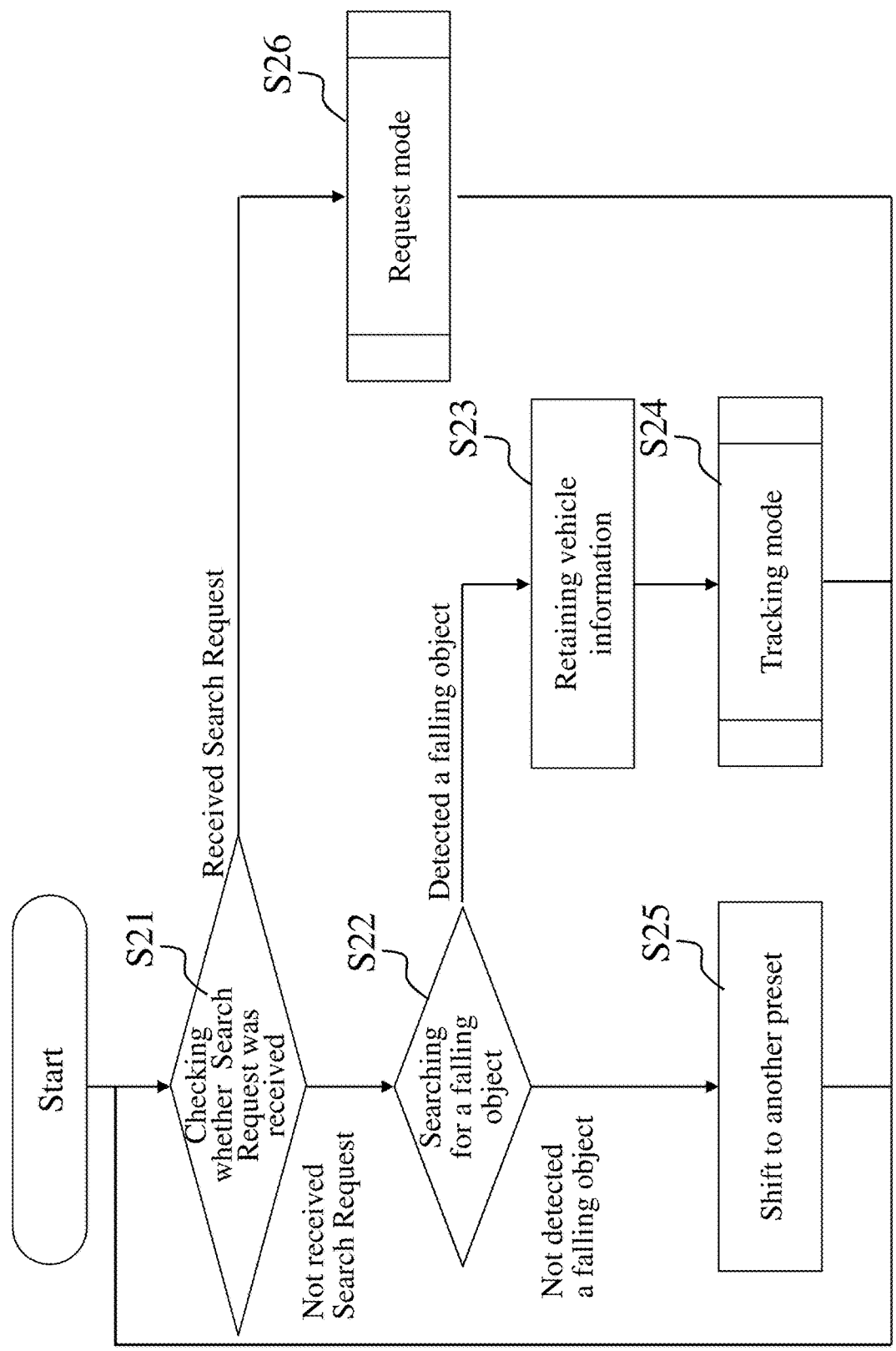
FIG. 3 is a controlling flowchart indicating one embodiment of each camera of the falling object detecting system.

FIG. 3 shows a controlling flowchart in camera controlling device 15 of camera assembly 1, or camera controlling device 15 of camera assembly 2 which includes a same configuration as camera assembly 1, according to this embodiment. In following description, camera assembly 1 represents camera assembly 2 or other camera assemblies. Controller 1501 disclosed in FIG. 16 is configured to control the overall of the camera assembly 1 including a change of operational mode.

Initially, in Step S21, camera controlling device 15 checks whether camera assembly 1 was received a command (digital message data) for Search Request as to a falling object from another camera assembly. When camera assembly 1 was received the command for Search Request as to the falling object from another camera assembly, a controlling procedure of camera controlling device 15 is shifted to Request mode S26. This situation may occur when the other camera assembly transmitted the command for Search Request as to the falling object to camera assembly 1 as a neighboring camera assembly, or camera assembly 1 as a camera assembly which is more likely to detect the falling object, because the other camera assembly lost the sight of the falling object due to movement of the falling object, although the other camera assembly had detected the falling object once.

When camera assembly 1 does not receive the command for Search Request as to a falling object from the other camera assembly, camera controlling device 15 has image recognition device 14 search a falling object within the angle of view currently being photographed by camera assembly 1 in Step S22.

In a case that image recognition device 14 detects a falling object, image recognition device 14 may retain approximate time when detecting the falling object, or the vehicle information including the vehicle's image, color, size, type or the number of license plate as clues to identify the vehicle that dropped the falling object in Step S23. Thereafter, the operational mode is shifted to Tracking mode in Step S24, explained using FIG. 5. In Tracking mode, camera controlling device 15 tracks the falling object with determining a degree of danger as to the falling object, or determining whether the position of the falling object was changed or not.

On the other hand, if camera controlling device 15 determines that there is no falling object in Step S22, camera controlling device 15 controls PTZ device 12 so as to shift the angle of view of camera assembly 1 to another angle of view corresponding to another preset position (Step S25), then the controlling procedure of camera controlling device 15 returns to the beginning of the flowchart. In addition, as frequent changes of the angle of view may cause a mechanical trouble of PTZ device 12, the loop periods from Steps S21 to S25, Steps S21 to S26, or the number of preset positions can be appropriately set.

Figure 4:
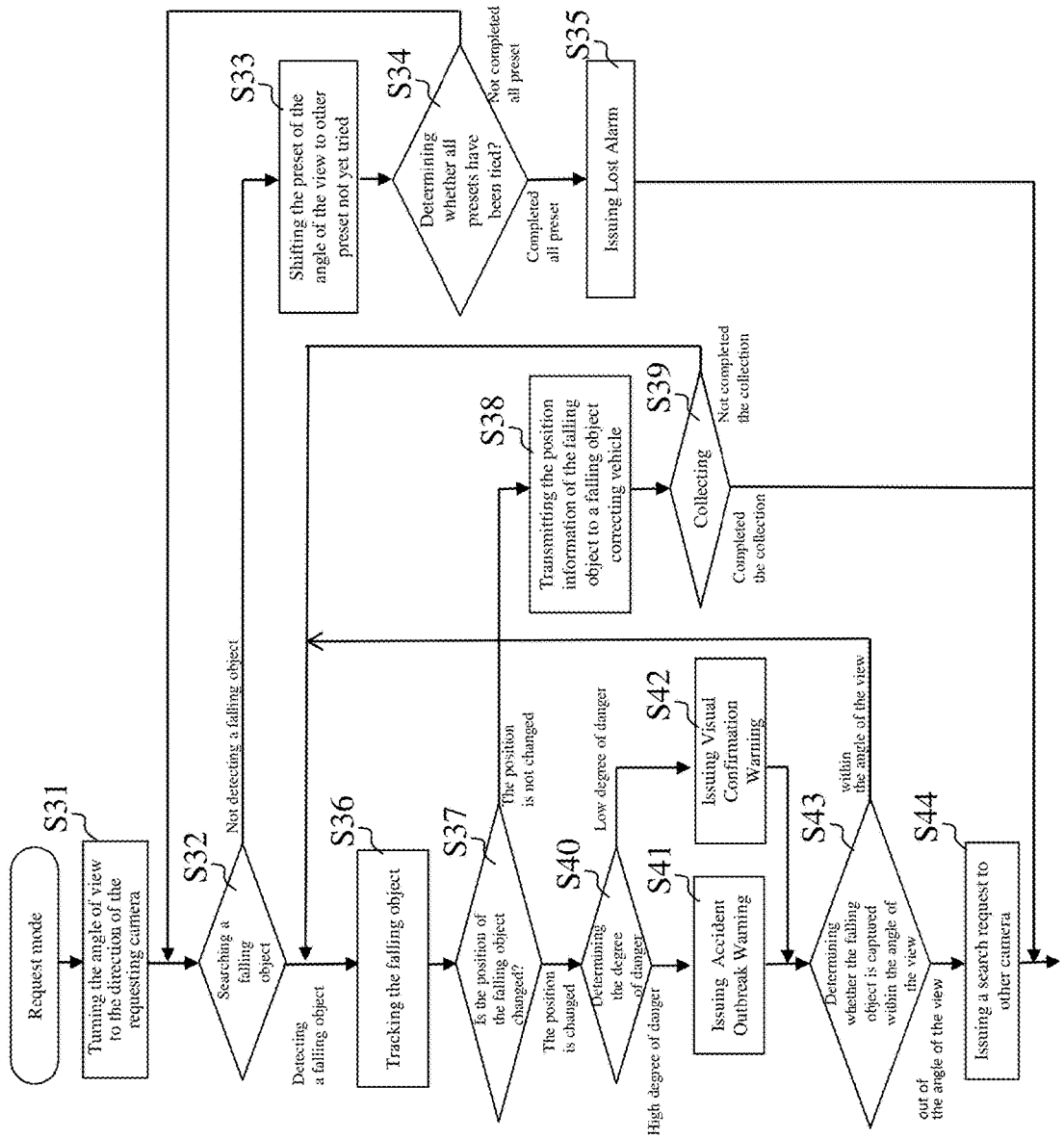
FIG. 4 is a flowchart indicating one embodiment of Request mode.

FIG. 4 is a flowchart indicating one embodiment of Request mode S26 in FIG. 3. When camera assembly 1 is received the command for Search Request as to the falling object from the other camera assembly, a controlling procedure of camera controlling device 15 is shifted to Request mode S26 as illustrated in FIG. 3.

The command for Search Request may include area information 1528 where an angle of view of imaging device 11 should be directed to search for the falling object, area information 1528 including at least one of the position information regarding the camera assembly which issued the Search Request, the position information as to the falling object, which was identified by the camera assembly which issued the Search Request, or a future predictive position of the falling object on the global coordinate system, which was identified by the camera assembly which issued the Search Request. For example, the command for Search Request may include information identifying the position of a camera assembly which lost or may lose the image of falling object. In addition, the command for Search Request may include information identifying the position of the falling object, performed coordinate conversion from the screen coordinate system to the global coordinate system. The command for Search Request may include information identifying a future predictive position on the global coordinate system, the future predictive position may be supposed from the movement direction of the falling object up to the time.

The command for Search Request may include information identifying the degree of danger as to the falling object, based at least in part on a value which was determined when the falling object was detected.

The command for Search Request may include information identifying the characteristic value of the falling object to detect or track the falling object continuously. The characteristic value may include information as to a shape of the falling object, or parameters in the Hue, Saturation, Value (HSV) space, which was identified by the camera assembly which issued the Search Request.

Firstly, in Step S31, camera controlling device 15 controls the PTZ device 12 so as to turn the angle of view of imaging device 11 of camera assembly 1 to the direction identified by the area information 1528. For example, if area information 1528 identify the position of the camera assembly which issued the Search Request, as a first place that should look for the falling object, camera controlling device 15 controls PTZ device 12 so as to turn the angle of view of imaging device 11 to the direction of the camera assembly which issued the Search Request, specified by area information 1528 of Search Request. For example, the area information received from the requesting camera assembly may include the information regarding the angle of view of camera assembly 1, which should direct initially. The information may include the position information of the requesting camera assembly, the position information of the falling object, or the future predictive position information of the falling object. The position information may convert to the preset position to control PTZ device 12 by referring to the corresponded preset position among the list of preset positions stored in PTZ device 12.

In a situation that the camera assembly which is requesting camera assembly 1 to search for the falling object is far away even if it is the neighboring camera, the preset position of imaging device 11 may correspond to an angle of view for the farthest point (vanishing point) of the road that can be seen, and the zooming magnification of image device 11 may be set nearly maximal.

Thereafter, image recognition device 14 performs searching the falling object in Step S32. A method for searching the falling object in Step S32 includes, for example, selecting an object having a characteristic value close to the characteristic value of the falling object notified by the camera assembly, as the object which should be detected or tracked continuously. A method for searching the falling object in Step S32 also includes, for example, selecting an object detected by a method of template matching, compared with an image before receiving Search Request, as the falling object.

If image recognition device 14 cannot detect the falling object in current angle of view of camera assembly 1, the angle of view of camera assembly 1 can be shifted to another angle of view corresponding to another preset position not yet tried to search the falling object (Step S33). Thereafter, camera controlling device 15 determines whether all preset positions have been tried to search for the falling object (Step S34). The term "All preset positions" are not limited to completely all preset positions installed in camera controlling device 15, the term "all preset positions" can be limited to a specific group of preset positions, configured by a plurality of specific preset positions, at least each preset position substantially expected the existence of the falling object. The specific group of preset positions may exclude a preset position where the existence of the falling object is not expected. Image recognition device 14 may perform searching a falling object by referring to at least the angles of view, which are limited to the angles where the falling object are likely to exist.

When Image recognition device 14 cannot detect the falling object with respect to possible preset positions, camera controlling device 15 can issue a command (message) for Lost Alarm to network 4, and then ends the procedure of Request mode.

When a falling object is detected in Step S32, image recognition device 14 may perform a tracking process for the falling object in appropriate time intervals, for example, in a timing when a picture frame generated in imaging device 11 is input into image recognition device 14 in Step S36. The tracking process may be an iterative process of updating the position information as to the falling object, by detecting an object having an image similar to the object previously detected as a possible falling object, in the vicinity of the object previously detected. The camera controlling device 15 may also include a circuit configured to track an object by referring to the characteristic value of an object which calculated by the camera assembly issued Search Request. Meanwhile, camera controlling device 15 may control PTZ device 12 so as to display the falling object at suitable magnification, positioned near the center of the screen of monitoring center 3. In addition, information regarding at least a size or movement of the falling object may be retained for a predetermined time, for using the information to estimate the degree of danger later. This iterative process is continued until it is determined that the falling object cannot be captured within the angle of view in Step S43, or until it is determined that a collection process has been completed in Step S39.

In Step S37, as a result of performing the tracking processes, which contains repeating processes from Step S43 or S39, to Step S36, camera controlling device 15 determines whether the position of the falling object was changed, in other word, camera controlling device 15 may determine whether the position of the center of gravity, estimated based at least in part on the captured image of the falling object was changed in Step S37. If the position of the falling object does not change, camera controlling device 15 may transmit the position information of the falling object to monitoring center 3 in Step S38, the position information including the information that the falling object was not moved. In monitoring center 3, an operation for transmitting the position information of the falling object to a falling object correcting vehicle may perform appropriately. Furthermore, in order to provide the information regarding the falling object as driving support information, the information of the falling object may provide to a server or a managing device of Electronic Toll Collection System 2.0 (ETC 2.0), through the ETC 2.0 roadside equipment installed along the road.

Next, when camera controlling device 15 determines that the collection for the falling object was completed, or the object is not a falling object, for example, the object is determined as a lane marking sign or construction work machine etc. in Step S37, such information may be notified to the falling object correcting vehicle, the server, or the managing device of ETC 2.0 via monitoring center 3, then the procedure of Request mode in camera controlling device 15 may end. On the other hand, while the falling object has not been collected, the controlling procedure of camera controlling device 15 returns to Step S36 for continuing the tracking process.

In Step S37, if camera controlling device 15 determines that the position of the falling object was changed, camera controlling device 15 may determine the degree of danger as to the falling objects, based at least in part on the degree of danger, which is received from the camera assembly issued Search Request, or the degree of danger, which is independently estimated in Step S32. The degree of danger is described by referring to FIG. 6 later. At a high degree of danger, camera controlling device 15 may issue a command for Accident Outbreak Warning to convey the possibility of outbreak of the accident to network 4 in Step S41, because camera controlling device 15 determines that the falling object might be moved from the position, where the falling object had been detected by the camera assembly which issued Search Request, to the current position by coming in contact with another vehicle. At a low degree of danger, camera controlling device 15 may issue the command for Visual Confirmation Warning to network 4 in Step S42. The command for Visual Confirmation Warning induces someone to confirm the object visually Next, in Step S43, according to the result of tracking procedure as to the falling object in Step S36, camera controlling device 15 may determine whether the falling object is captured within the angle of view, in other words, determine whether or not the tracking procedure as to the falling object has successfully been completed in Step S36. While the falling object is captured within the angle of view, the tracking procedure as to the falling object is continued by branching into Step S36. Normally, in a case that the tracking procedure as to the falling object has ended in failure in succession several times, in other words, in a case that image recognition device 14 cannot find a position where an image of an object currently captured substantially matches the image of the falling object previously captured, camera controlling device 15 can determine the image of the falling object is out of the current angle of view. There is a possibility that the falling object might be blown off by coming in contact with another vehicle. Therefore, when the falling object cannot be tracked temporarily, it may be effective for capturing the falling object that the angle of view is shifted to a traveling direction of the vehicle little by little. Circuit 1504 supports the angle of view of imaging device 11 so as to shift to a traveling direction of the vehicle little by little to look for the object.

When camera controlling device 15 determines that an image of the falling object is out of the angle of view, in other words, determines that the falling object was moved to the outside of the angle of view, or the falling object cannot be captured because the position of the object is too far away, camera controlling device 15 can issue a command for Search Request as to the falling object to another device connected the network, the other device includes a different camera assembly, for example camera assembly 2, then the procedure for Request mode in camera controlling device 15 ends.

The command for Search Request may include the information of the degree of danger which was estimated in Step S40, or determined by circuit 1525 or calculated by calculator 1526 described in FIG. 16.

The command for Search Request may include area information 1528 calculated by calculator 1527, or coordinate information on the global coordinate system as to a target object calculated by calculator 1530.

The command for Search Request may include the characteristic value calculated by calculator 1532.

The destination camera which should receive the command for Search Request may be camera assembly 2, which is located around camera assembly 1. The destination camera assembly may also be located at adjacent to the camera assembly 1. In addition, the destination camera assembly, which should receive the command for Search Request can be narrowed down to at least a camera assembly located near the traffic lane where the falling object was existed, the camera assembly being located in a travelling direction of the traffic lane.

In the flowchart of FIG. 4, each Step S36 to S43 can be executed by changing the order of execution of each step appropriately.

Figure 5:
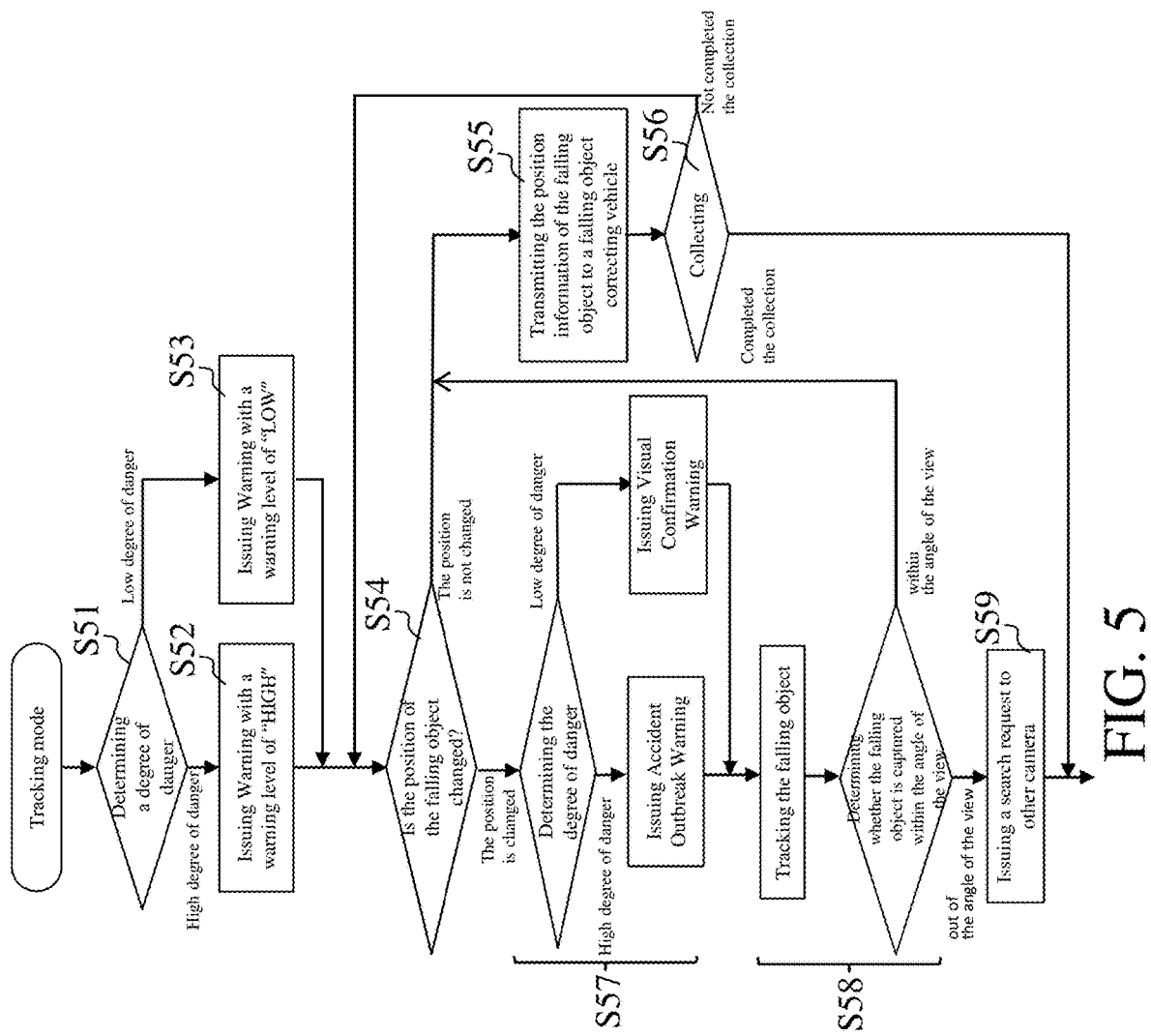
FIG. 5 is a flowchart indicating one embodiment of Tracking mode.

FIG. 5 is a flowchart indicating one embodiment of Tracking mode, identified as Step S24 in FIG. 3. Firstly, camera controlling device 15 may determine a degree of danger as to the falling object in response to a transition to Tracking mode in Step S51. At that time, image recognition device 14 may determine the degree of danger by referring to a time series image (moving image) of the falling object, acquired from imaging device 11. At a high degree of danger, a command for Warning with a warning level of "high" is issued in Step S52. At a low degree of danger, a command for Warning with a warning level of "low" is issued in Step S53.

The subsequent procedures may be similar to the procedures Step S36 to S44 in Request mode, identified in FIG. 4. In other words, the position of the falling object is determined in Step S54. If the position of the falling object did not change, the position information is transmitted to a falling object collecting vehicle via network 4 in Step S55. When the collection as to the falling object was completed, Tracking mode is ended in Step S56. When camera controlling device 15 determines that the falling object was moved, camera controlling device 15 may transmit a warning in accordance with the degree of danger, determined in Step S51 or Step S57. When the falling object, having a high degree of danger was moved, the command for Accident Outbreak Warning may be issued, and when the falling object, having a low degree of danger was moved, the command for Visual Confirmation Warning to confirm the object by viewing may be issued. Camera controlling device 15 may continue to track the falling object even after issuing each command of warning in Step S58. In a situation that the image of the falling object can be captured within the angle of view of camera assembly 1, the tracking procedure may be continued. When image recognition device 14 determines that the image of the falling object moved outside the angle of view, or predicts to move outside the angle of view considering a current movement path, camera controlling device 15 may transmit a command for Search Request as to the falling object to other camera, then the control procedure as Tracking mode in camera controlling device 15 is ended in Step S59.

Figure 6:
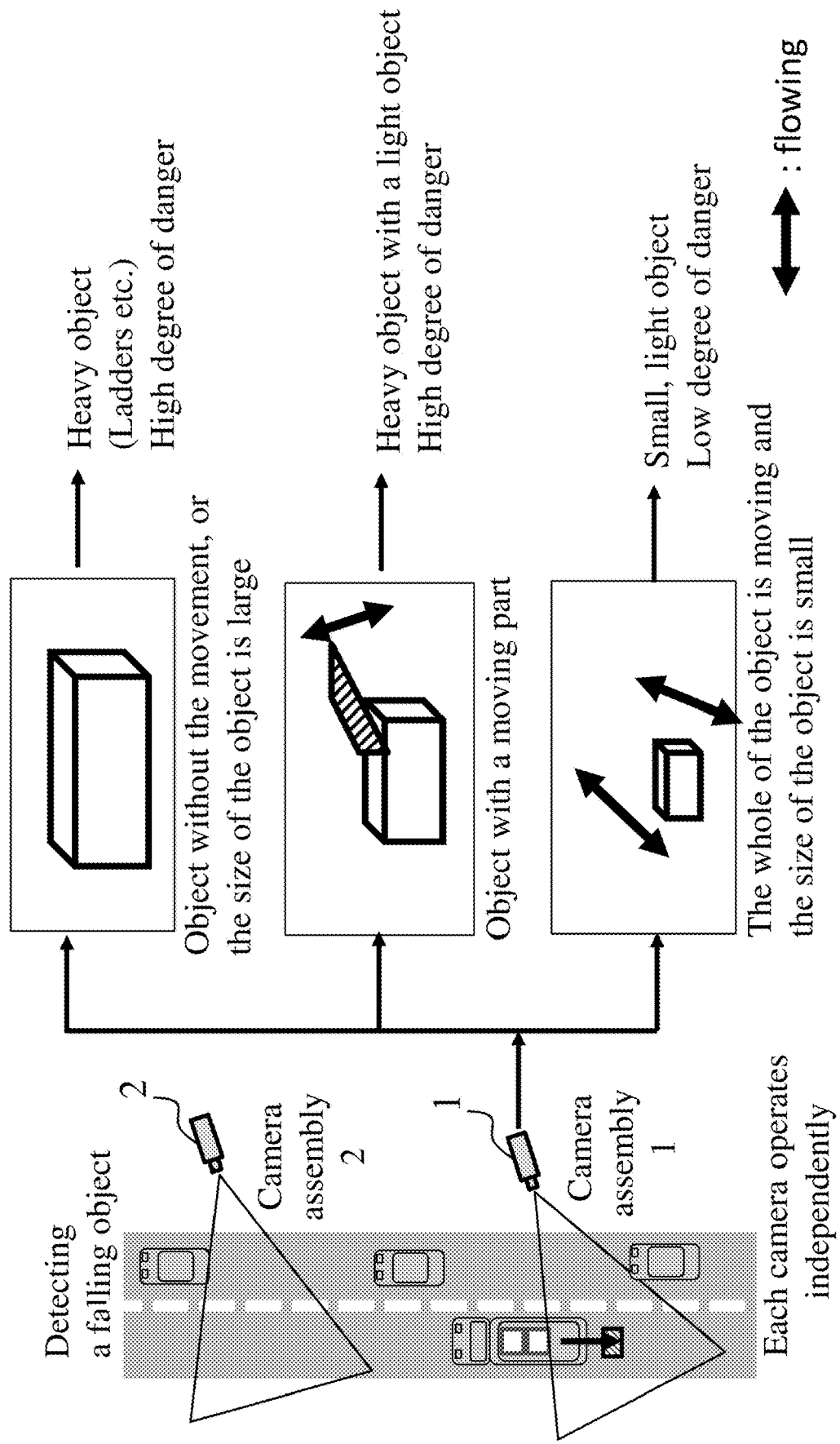
FIG. 6 is a diagrammatic illustration indicating one embodiment for determining a degree of danger as to the falling object.

FIG. 6 is a diagrammatic illustration indicating one embodiment for determining a degree of danger as to the falling object. When image recognition device 14 detects a falling object, camera controlling device 15 may estimate a degree of danger as to the falling object based at least in part on the size of the falling object or the movement information of the falling object in Step S40, or S51. The size of the object may be identified with the size of the object in the real space. The size of the object in the real space is calculated by using the controlling values of panning operation, tilting operation, or zooming operation in PTZ device 12, provided to image recognition device 14 for performing coordinate conversion from the screen coordinate system to the global coordinate system. The size of the object may also be identified by comparing with a specific object that size is known, the specific object being captured within an angle of view same as the object.

When it is determined that the size of the falling object in the real space is larger than an average size or a predetermined size of the falling objects, the degree of danger may be estimated to be high regardless of the material of the object, or an attribute other than the size of the falling object. For example, the average size or the predetermined size of the falling object can be identified statistically, and memorized in camera controlling device 15 initially. In addition, in a case that there is no movement regardless of the size of the falling object, it is assumed that the object is a heavy object, the degree of danger as to the object may be estimated to be high. In addition, in a case that it is determined that a part of the object is moving, the degree of danger may be estimated to be high if a ratio of the moving part is larger than a predetermined ratio identified statistically, because it is assumed that a heavy object and a light object dropped together such as a situation that a blue sheet is spread under the drum can. In addition, the degree of danger as to a small object moving generally may be estimated to be low because the small object is assumed to be something like plastic bag. For example, the degree of danger may be calculated and retained as a numerical value, and determined in Step S40 or S51.

As a method for detecting a falling object to distinguish an object from a traveling vehicle, or a shadow of the vehicle, in Step S22, S32, etc. for example, a statistical learning method using characteristic values (feature quantities) can be used. Circuit 142 configured to detect an object in image recognition device 14 may include a circuit configured to detect a falling object to distinguish an object from a traveling vehicle, or a shadow of the vehicle, by using characteristic values under the statistical learning method. For example, an orientation map obtained by quantizing the intensity gradient image in the HSV space (Hue, Saturation, Value (Brightness) space model), a histogram thereof, or the like can be used as the characteristic value (feature quantity, Value corresponding to the characteristic of an object). Image recognition device 14 can estimate that an area composed mostly of gradients (edges) with only saturation is an area corresponding to a shadow, or an area illuminated with lights. Thus, image recognition device 14 can detect other image, which was newly captured, as a falling object. In addition, characteristic values (feature quantities) extracted from traveling vehicles can be learned as incorrect data as to the falling object in the statistical learning method using characteristic value (feature quantities).

In addition, in order to reduce a target area for processing, a conventional method such as the image processing method using a background difference can combine with the statistical learning method using feature quantities. In that case, image recognition device 14 may retain an updated background image while searching a falling object at each preset position, then use the updated background image for calculating a background difference when returning to the same preset position again.

In addition, as it is considered that a falling object may be moved against a direction traveling a vehicle, image recognition device 14 can use a flow or edge information included in the image as the characteristic values (feature quantities) for the purpose of detecting a moment of falling. After falling, an object is considered to be almost stationary on the road once, so it is possible to determine that an object detected sometimes at the same position within a predetermined time as a falling object.

As a method for tracking a falling object in Step S36, S58, etc. a method of template matching can be used. In the method of template matching, an image of a falling object is cut out from a frame in which a falling object is detected, the image of the falling object can use as a template image for tracking procedure. As the image of the falling object may be often intercepted by passing vehicles in front of camera assembly 1, a processing load for tracking the falling object using the method of template matching for the whole angle of view may be increased. Therefore, in order to reduce the processing load for tracking the falling object, some method including a particle filter for the active search or the stochastic search, or Mean Shift for performing local search can be used. Movement of a falling object may be classified in an entire motion of the falling object (translational movement), and a partial motion of the falling object. The entire motion of the falling object can be detected by using the method of template matching or the like, the partial motion of the falling object can be detected, for example, by a difference of images as to the falling objects being aligned, in other words, a residual value as a result of template matching, or by the processing of Time Space Fast Fourier Transform (Time Space FFT). The information as to both the entire and partial motions of the falling object can be used for estimating a degree of danger as to the falling object. In addition, the processing of Time Space FFT can be performed in two-dimensional space by converting image data in the two-dimensional coordinate system into column vectors. It is desirable that a value indicating a degree of the partial motion be normalized so as not to depend on the appearance or the size of the falling object.

Figure 7:
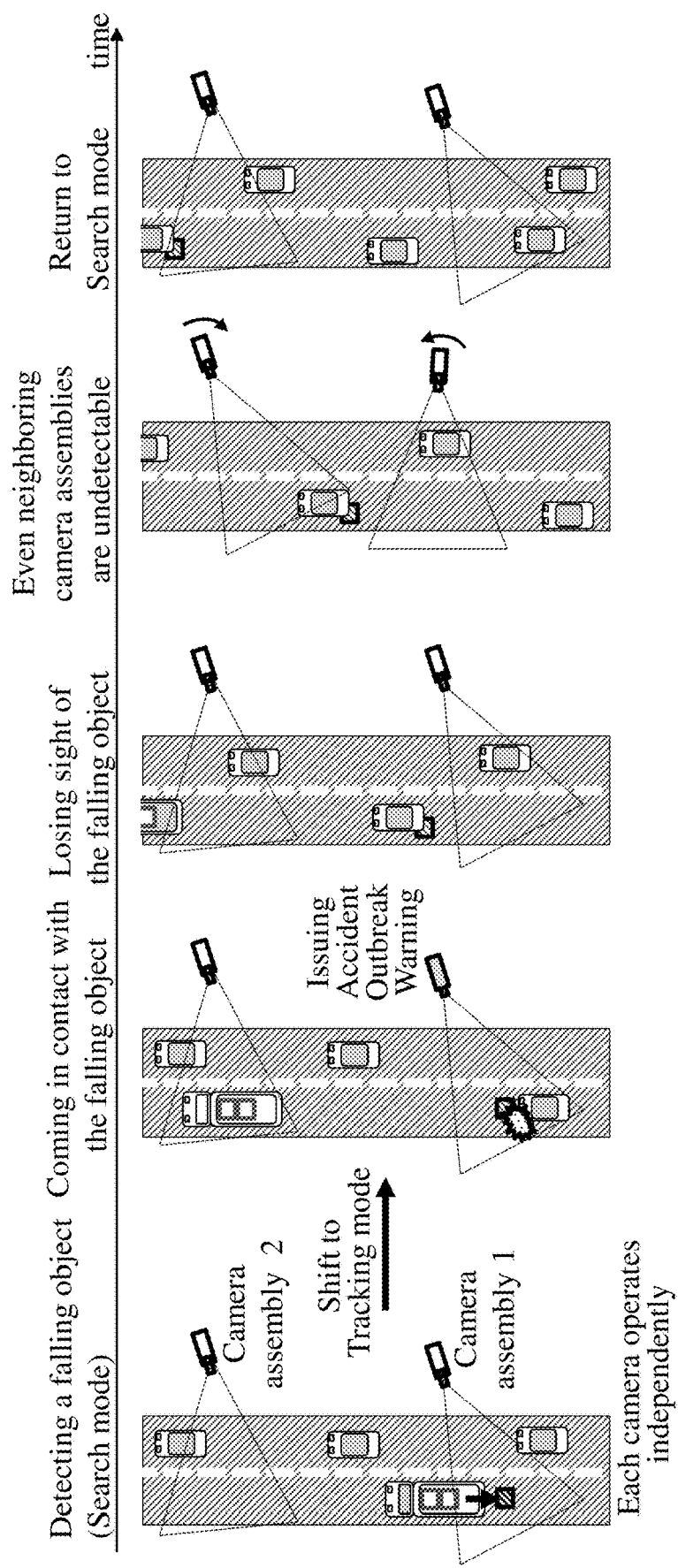
FIG. 7 is a diagrammatic illustration indicating one embodiment of the operation when a falling object is dragged.

FIG. 7, FIG. 8, FIG. 9, and FIG. 10 schematically illustrate embodiments of operations of the falling object detecting system when a truck drops an object. FIG. 7 is a diagrammatic illustration indicating one embodiment of the operation in a case that a falling object collided with a vehicle, the collided vehicle drags the falling object without noticing the falling object. FIG. 7 shows the transitions of the relation between a vehicle and an object, according to progress of the time illustrated from the left side to the right side. For example, a light object such as a blue sheet may cause this kind of situation. Firstly, when image recognition device 14 detected a falling object, an operational mode of camera controlling device 15 was switched to Tracking mode as shown Step S22 to S24 in FIG. 3, and the position of the falling object was monitored as illustrated in most left side of FIG. 7. In a case that a following vehicle came in contact with the falling object and the falling object was dragged by the following vehicle, camera controlling device 15 might issue the command for Accident Outbreak Warning as illustrated in the second position from the left side in FIG. 7. When the vehicle coming in contact with the falling object dragged the falling object, the camera which detected the falling object might lose sight of the falling object. At this time, camera controlling device 15 might transmit a command for Search Request as to the falling object to a neighboring camera as illustrated in the middle position in FIG. 7, but if the falling object could not be detected again by even the neighboring camera as illustrated in the fourth position from the left side in FIG. 7, the operational mode of each camera might return to Search mode as illustrated in most right side of FIG. 7. The vehicle dragging the falling object might be identified by referring to the image, which captured at the timing when the command for Accident Outbreak Warning was issued.

Figure 8:
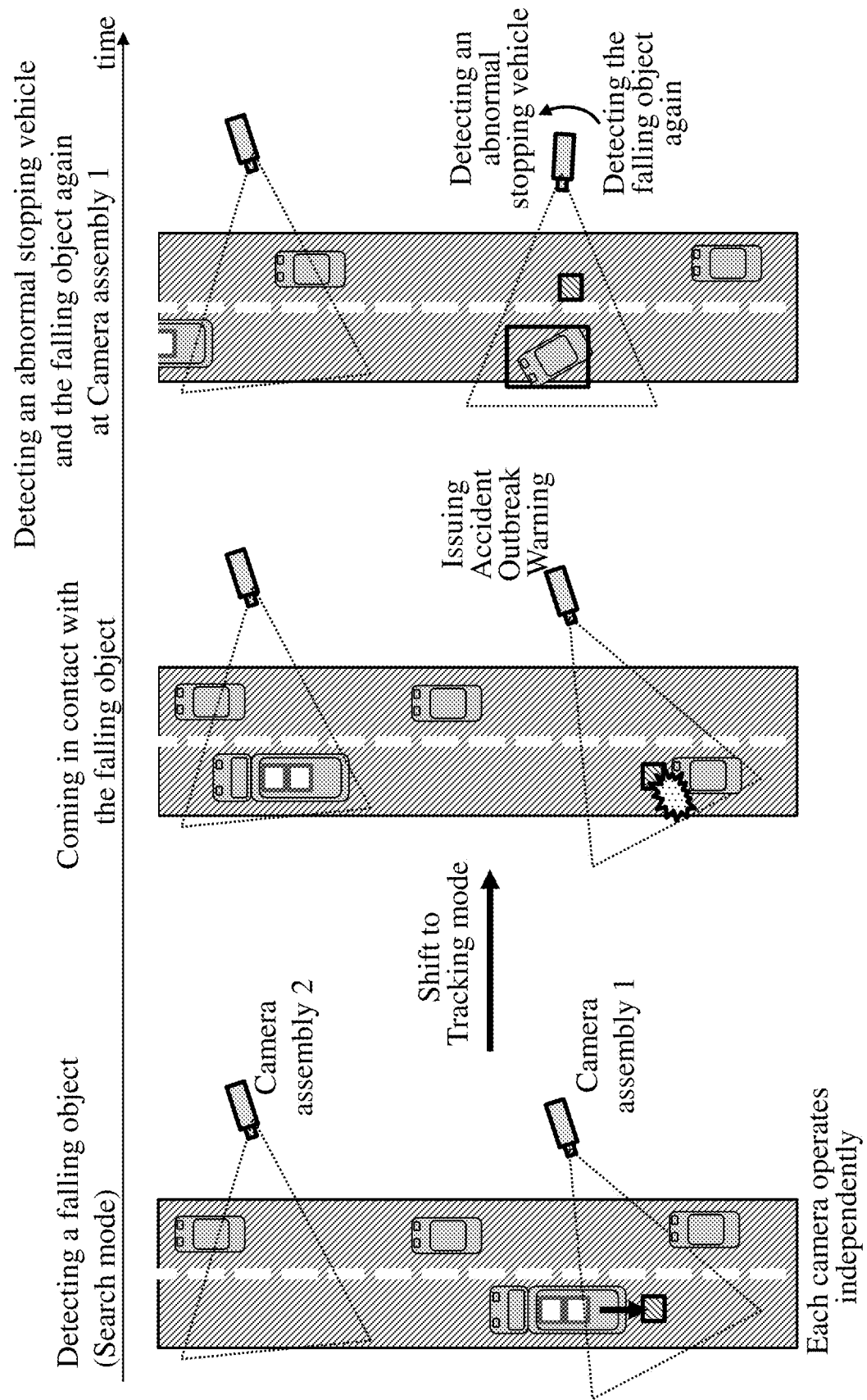
FIG. 8 is a diagrammatic illustration indicating one embodiment of the operation when the falling object is blown out due to a collision.

FIG. 8 is a diagrammatic illustration indicating one embodiment of the operation in a case that a falling object is moved to another position due to a collision with a vehicle. FIG. 8 shows the transitions of the relation between a vehicle and an object, according to progress of the time illustrated from the left side to the right side. The position of the falling object is changed when the falling object collided with a vehicle. Camera controlling device 15 may issue the command for Accident Outbreak Warning, and the falling object is tracked as illustrated in the middle position in FIG. 8. Next, if there is a vehicle being stopped around the accident site, the vehicle can be also detected as an abnormally stopping vehicle as illustrated in most right side of FIG. 8.

Figure 9:
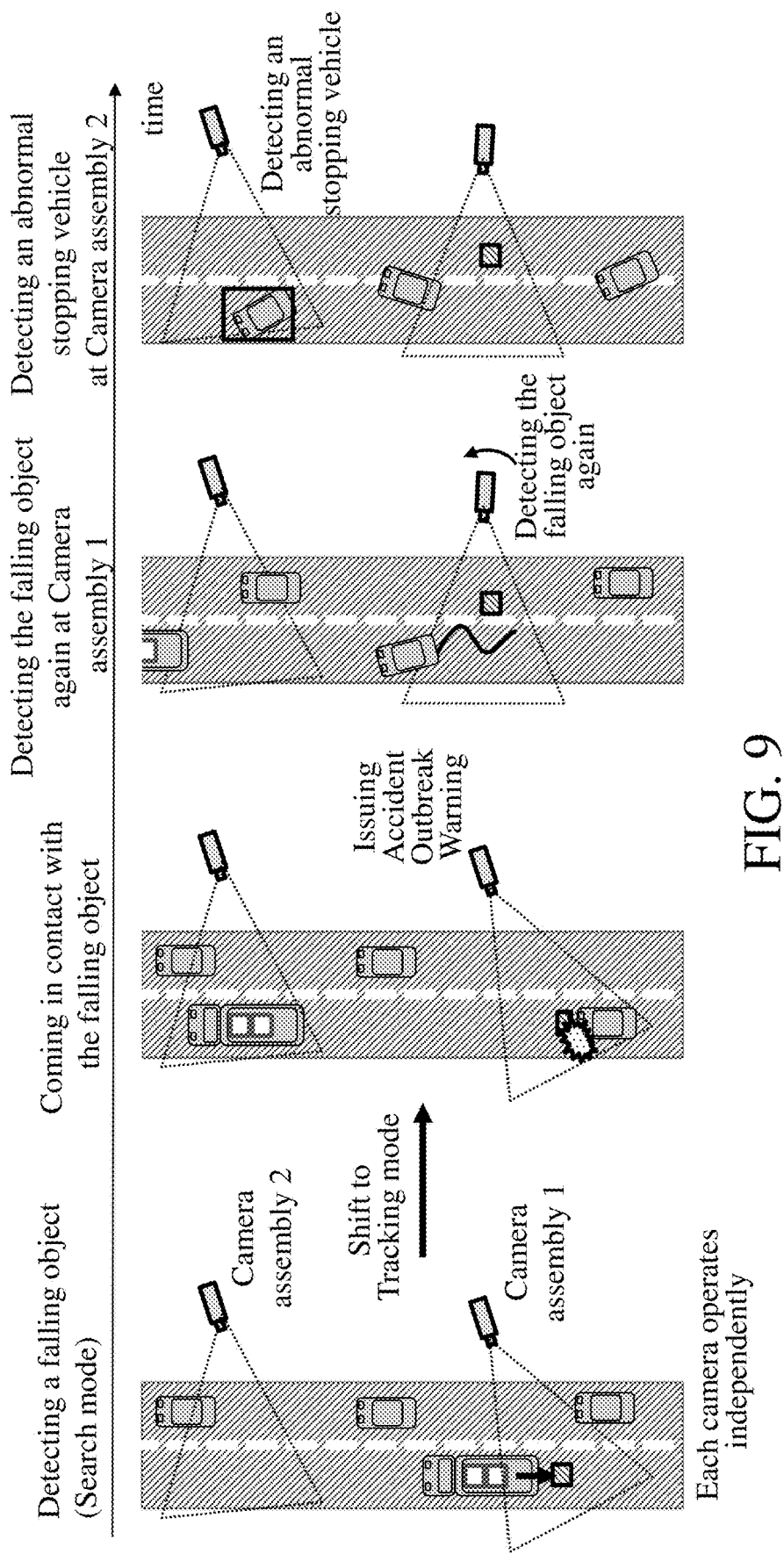
FIG. 9 is a diagrammatic illustration indicating another embodiment of the operation when the falling object is blown out due to a collision.

FIG. 9 is a diagrammatic illustration indicating one embodiment of the operation in a case that a falling object is moved to another position due to a collision with a vehicle, and a vehicle has stopped in the monitoring range of another camera. FIG. 9 shows the transitions of the relation between a vehicle and an object, according to progress of the time illustrated from the left side to the right side. When a falling object collided with a vehicle, the command for Accident Outbreak Warning is issued, and camera assembly 1 tracks the falling object as illustrated in the second position from the left side in FIG. 9. In camera 2, when a stopped vehicle is detected, camera controlling device 15 of camera 2 may assume the stopped vehicle to be an abnormally stopped vehicle in consideration of a situation that the command for Accident Outbreak Warning was received from camera assembly 1 as illustrated in most right side of FIG. 9.

Figure 10:
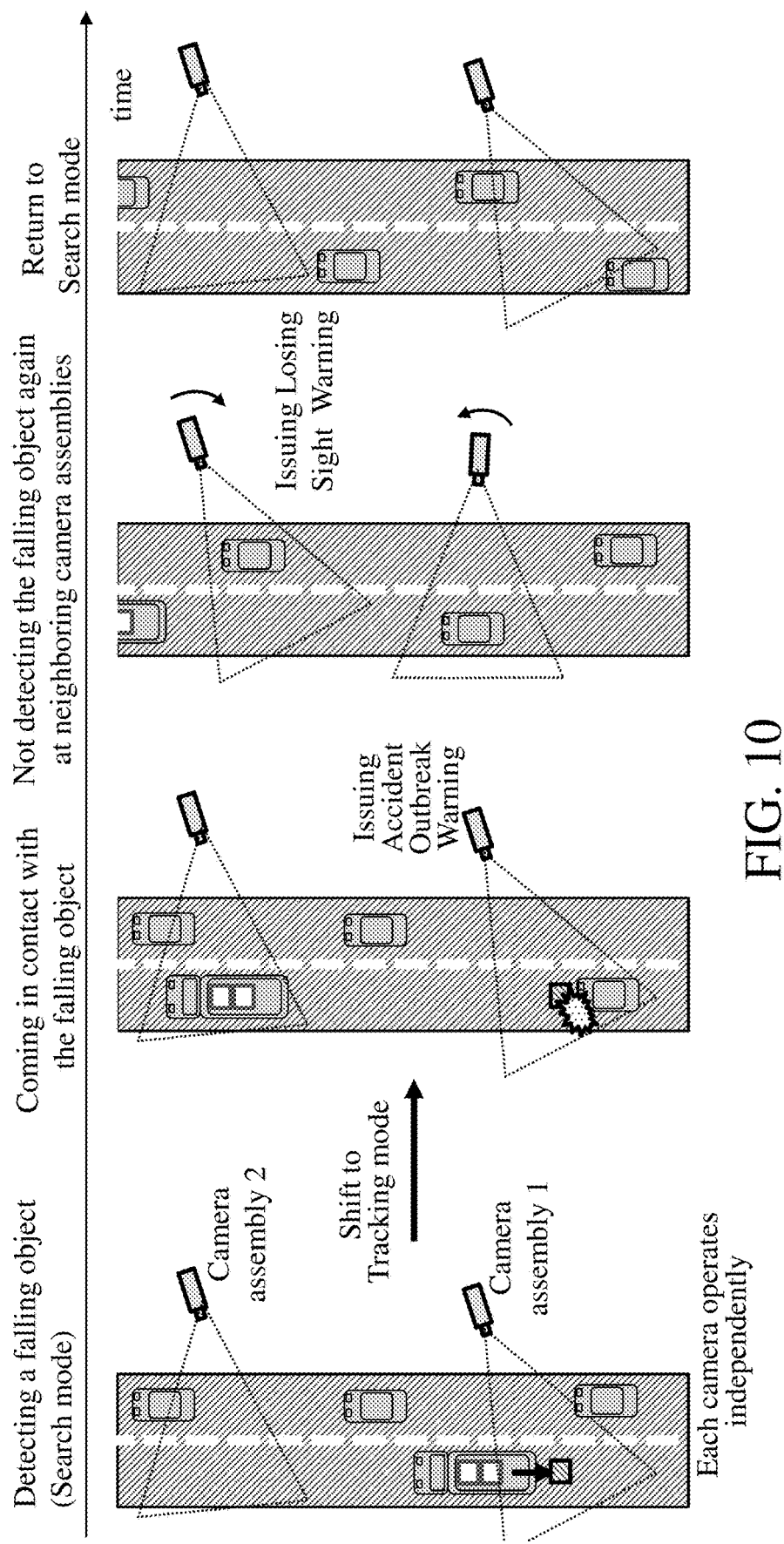
FIG. 10 is a diagrammatic illustration indicating one embodiment of the operation where the falling object is blown out due to a collision and cannot be detected again.

FIG. 10 is a diagrammatic illustration indicating one embodiment of the operation in a case that camera controlling device 15 cannot detect the falling object again because the falling object is moved to the outside of the road due to a collision with a vehicle. FIG. 10 shows the transitions of the relation between a vehicle and an object, according to progress of the time illustrated from the left side to the right side. When the falling object collides with a vehicle, the command for Accident Outbreak Warning is issued as illustrated in the second position from the left side in FIG. 10. If even the neighboring camera cannot detect the falling object again, the command for Losing Sight Warning is issued as illustrated in the third position from the left side in FIG. 10, the operational mode of each camera may return to Search mode as illustrated in most right side of FIG. 10. At this time, it is desirable that camera controlling device 15 transmits the information indicating some kind of falling object having been lost from sight of someone managing roads or facilities outside the jurisdiction.

As described above, this embodiment discloses an autonomous distributed cooperative system so as to track a falling object, detected by a plurality of cameras in cooperation with each other. In such a system, monitoring center 3 does not need a large-scale facility for intensive processing as long as it can receive or cancel an alarm, and it is easy to introduce it. In addition, Search request as to the falling object performed in Step S59 is not limited to being performed from the camera, but may be performed from a host system such as a traffic control system that grasps the occurrence of traffic congestion or accident.

The scope of the disclosure can include the configuration of the embodiments explained so far, but is not limited thereto. For example, image recognition device 14 may detect road damage, an obstacle, or a vehicle stopped urgently etc. by applying the recognition/learning techniques disclosed above appropriately. In addition, in order to analyze the image which has not become high resolution on imaging device 11, contrast correction, fluctuation correction, shake correction, super-resolution processing, etc., may be performed as preprocessing. Instead of measuring the speed of the vehicle, the number of vehicles passing per predetermined time may be measured, and the congestion start point may be searched from the change.

In addition, image recognition device 14 can recognize the traveling direction of the vehicle, or the traffic lane by optical flow techniques or the like, and can issue warnings with different degrees of danger levels in accordance with the positional relationship between the traffic lane and the falling object. For example, in a case that a falling object, previously detected in the roadside, except for the traffic lane, has currently moved to the traffic lane, a warning indicating a higher degree of danger may be reissued.

Figure 11:
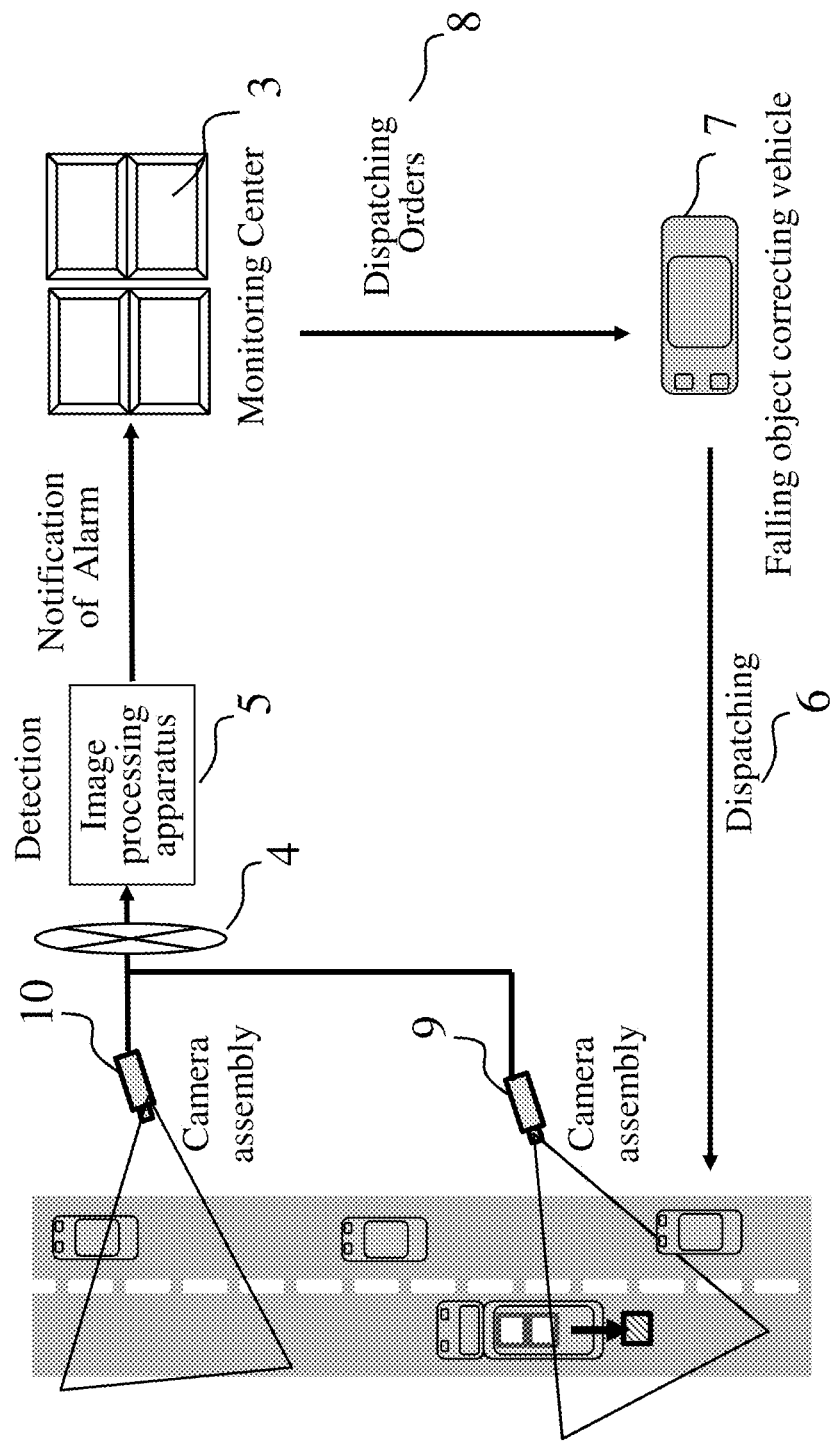
FIG. 11 is a diagrammatic illustration indicating one embodiment of a falling object detecting system when an image processing technology is installed in a separate image processing apparatus.

In addition, image recognition device 14 is not limited to being built in camera assembly 1 itself. FIG. 11 shows an example of a falling object detection system, including image processing apparatus 5 having a function of image recognition device 14, image processing apparatus 5 being installed in the latter stage of the network 4 in the case that image recognition device 14 cannot be installed in camera 9. Normally, electrical equipment such as a junction box may be provided at the connection point between camera 9 and network 4 to supply electrical power to camera 9 etc., Therefore, image processing apparatus 5 can be provided therein.

REFERENCE SIGNS LIST

1: camera, 2: camera, 3: monitoring center, 4: network, 5: image processing apparatus, 6: dispatching, 7: falling object correcting vehicle, 8: dispatching orders

The invention claimed is:

1. A system for detecting a falling object by using a plurality of camera assemblies, each of the plurality of camera assemblies comprising:
a controller configured to:
search for a falling object in an area by shifting an angle of view cyclically in a normal state,
transmit an alarm message corresponding to a degree of danger to another camera assembly via a network, and
enter a tracking mode when the falling object is detected, wherein in the tracking mode, the controller is further configured to:
reevaluate the degree of danger by considering: a moving path of the falling object, a size of the falling object in real space, and whether the falling object includes a moving part,
wherein the degree of danger is estimated to be high if:
the size of the falling object in real space is larger than a predetermined value,
there is no movement of the falling object on a road, and
a ratio of the moving part to the falling object is smaller than a predetermined value,
issue an alarm message corresponding to the degree of danger reevaluated,
issue a search request to the another camera assembly, including position information to be monitored initially, when the falling object is lost from sight from an angle of view.

2. The system for detecting a falling object according to claim 1, wherein the controller is further configured to:
enter a request mode for searching for the falling object when the controller receives the search request including the position information to be monitored initially, and
turn an angle of view of the camera assembly to a direction identified by the position information initially.

3. The system for detecting a falling object according to claim 2, the system further comprising:
a display device connected to the camera assembly via the network, the display device configured to display an image of the falling object captured by the camera assembly with information regarding the degree of danger of the falling object.

4. The system for detecting a falling object according to claim 2, wherein each of the plurality of camera assemblies holds vehicle information obtained at a time near a time of detecting the falling object.

5. A camera assembly comprising:
an imaging device configured to photograph a scene, and output an image signal corresponding to the scene;
an image recognition device configured to at least detect an object by referring to the image signal; and
a camera controlling device, comprising:
a circuit configured to determine a degree of danger of the object by: moving information of the object, a size of the object in real space, and whether the object includes a moving part
a calculator configured to:
calculate area information to be searched by another device connected to a network, and
identify the degree of danger,
an estimator configured to estimate the degree of danger, wherein the degree of danger is estimated to be high if:
the size of the object in real space is larger than an average size or a predetermined size of an object regardless of a material of the object,
the object does not have a movement generally regardless of the size of the object, and
a ratio of the moving part to the object is smaller than a predetermined value, and
a transmitter configured to transmit a message including the degree of danger and the area information to the another device connected to the network.

6. The camera assembly according to claim 5, further comprising:
a PTZ device configured to be adjust an angle of view of the imaging device in response to a control from the camera controlling device,
wherein the calculator is further configured to:
calculate the size of the object in a real space by performing coordinate conversion from a screen coordinate system to a global coordinate system, and
use at least controlling values of panning, tilting, or zooming as to the falling object, stored in the PTZ device.

7. The camera assembly according to claim 6, wherein the camera controlling device further comprising:
an estimator configured to estimate the degree of danger as low when the size of the object in the real space is smaller than the average size or a predetermined size of the object and the object moves generally.

8. The camera assembly according to claim 5, wherein the area information including at least one of the position information regarding the camera assembly, the object, or a future predictive position of the object on the global coordinate system.

9. The camera assembly according to claim 8, wherein the camera controlling device is further comprising:
a transmitter configured to transmit a message including the request for searching for the object to the another device connected to the network, at any timing including:
(1) a timing when an output of the image recognition device shows that the object cannot be captured appropriately,
(2) a timing when an output of the image recognition device shows that the object is far away, (3) a timing when an output of the image recognition device shows that the object moves to outside of the angle of view in a predetermined time, and (4) a timing when an output of the image recognition device shows that the another device can capture the object more appropriately.

10. The camera assembly according to claim 5, wherein the camera controlling device further comprising:

a calculator configured to calculate a characteristic value of the object, including information as to a shape of the object, or parameters in the Hue, Saturation, Value (HSV) space; and a transmitter configured to transmit a message including the characteristic value of the object to the another device connected to the network.

11. The camera assembly according to claim 10, wherein the circuit is further configured to track the object by referring to the characteristic value of the object.

12. The camera assembly according to claim 11, wherein the camera controlling device further comprising:

a receiver configured to receive a message including the degree of danger of the object, the area information of the object, and the characteristic value of the object, from the another device connected to the network.

13. The camera assembly according to claim 12, wherein the circuit is further configured to turn an angle of view of the imaging device by referring to the area information that was received from the another device connected to the network; and wherein the camera controlling device further comprises a detector configured to detect the object having the characteristic value that is the same as or close to the characteristic value of the object that was received from the another device connected to the network.

14. The camera assembly according to claim 5, further comprising:

a video encoding device for encoding a digital image signal to a coded signal, wherein the camera controlling device is configured to transmit the coded signal to a monitoring center.

15. The camera assembly according to claim 5, wherein the another device is another camera assembly.

16. The camera assembly according to claim 15, wherein the image recognition device includes a circuit configured to detect the falling object to distinguish the object from a traveling vehicle, by using characteristic values under a statistical learning method.

17. The camera assembly according to claim 16, wherein the image recognition device circuit is further configured to:

recognize a traffic lane by optical flow information, and determine the degree of danger based at least in part on whether a location of the falling object is within the traffic lane, wherein the location of the falling object being recognized by the image recognition device.

* * * * *